(12) United States Patent
Yoo et al.

(10) Patent No.: US 12,484,797 B2
(45) Date of Patent: Dec. 2, 2025

(54) ELECTRONIC DEVICE AND METHOD FOR IDENTIFYING BODY TEMPERATURE OF USER

(71) Applicant: Samsung Electronics Co., Ltd., Suwon-si (KR)

(72) Inventors: Soohan Yoo, Suwon-si (KR); Hyunjun Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 242 days.

(21) Appl. No.: 18/355,147

(22) Filed: Jul. 19, 2023

(65) Prior Publication Data

US 2024/0172948 A1    May 30, 2024

Related U.S. Application Data

(63) Continuation of application No. PCT/KR2023/009987, filed on Jul. 12, 2023.

(30) Foreign Application Priority Data

Nov. 27, 2022   (KR) .......................... 10-2022-0161033
Dec. 30, 2022   (KR) .......................... 10-2022-0190844

(51) Int. Cl.
  *A61B 5/0295*   (2006.01)
  *A61B 5/00*     (2006.01)
  *A61B 5/01*     (2006.01)

(52) U.S. Cl.
  CPC .............. *A61B 5/0295* (2013.01); *A61B 5/01* (2013.01); *A61B 5/681* (2013.01); *A61B 5/7264* (2013.01); *A61B 5/746* (2013.01)

(58) Field of Classification Search
  None
  See application file for complete search history.

(56) References Cited

U.S. PATENT DOCUMENTS 11,134,859 B2   10/2021   Strasser et al.
11,553,850 B2    1/2023   Lee et al.
(Continued)

FOREIGN PATENT DOCUMENTS

CN    104758010 A    7/2015
CN    204520639 U    8/2015
(Continued)

OTHER PUBLICATIONS

Search Report and Written Opinion dated Nov. 7, 2023 issued in International Patent Application No. PCT/KR2023/009987.
(Continued)

*Primary Examiner* — Yi-Shan Yang
(74) *Attorney, Agent, or Firm* — Nixon & Vanderhye, P.C.

(57) ABSTRACT

According to an embodiment, an electronic device includes: a photoplethysmography (PPG) sensor, a temperature sensor, a memory, and a processor. The processor is configured to store first information on blood flow of a user, as associated with second information on temperature of a part of the user's body. The processor is configured to change a state of the temperature sensor from active state to inactive state. The processor is configured to identify that a first value representing the blood flow of the user is out of a first range. The processor is configured to change the state of the temperature sensor from the inactive state to the active state. The processor is configured to, based on identifying that a second value representing the temperature of the part of the user's body is out of the second range, provide a notification.

20 Claims, 13 Drawing Sheets

(56) References Cited

U.S. PATENT DOCUMENTS

| | | |
|---|---|---|
| 2016/0310027 A1* | 10/2016 | Han .................. A61B 5/02427 |
| 2016/0317089 A1* | 11/2016 | Fyfe .................. A61B 5/14551 |
| 2021/0106238 A1* | 4/2021 | Strasser ............... A61B 5/0008 |
| 2021/0321878 A1 | 10/2021 | Lee |
| 2023/0079489 A1 | 3/2023 | Cho et al. |
| 2024/0108290 A1 | 4/2024 | Jeon |

FOREIGN PATENT DOCUMENTS

| | | |
|---|---|---|
| CN | 108420411 | 8/2018 |
| CN | 108577817 | 9/2018 |
| CN | 109215291 | 1/2019 |
| CN | 114947765 | 8/2022 |
| JP | 2013202077 A | 10/2013 |
| JP | 6938325 | 9/2021 |
| KR | 10-2004-0090240 | 10/2004 |
| KR | 20040090240 A | 10/2004 |
| KR | 20150082965 A | 7/2015 |
| KR | 10-2020-0052056 | 5/2020 |
| KR | 10-2022-0053364 | 4/2022 |
| KR | 10-2022-0115024 | 8/2022 |
| WO | 2012/160500 | 11/2012 |

OTHER PUBLICATIONS

Extended European Search Report dated Oct. 16, 2025 issued in European Patent Application No. 23894710.5.

* cited by examiner

ELECTRONIC DEVICE AND METHOD FOR IDENTIFYING BODY TEMPERATURE OF USER

CROSS-REFERENCE TO RELATED APPLICATIONS

This application is a continuation of International Application No. PCT/KR2023/009987 designating the United States, filed on Jul. 12, 2023, in the Korean Intellectual Property Receiving Office and claiming priority to Korean Patent Application Nos. 10-2022-0161033, filed on Nov. 27, 2022, in the Korean Intellectual Property Office, and 10-2022-0190844, filed on Dec. 30, 2022, in the Korean Intellectual Property Office, the disclosures of each of which are incorporated by reference herein in their entireties.

BACKGROUND

Field

The disclosure relates to an electronic device and a method for identifying a body temperature of its user.

Description of Related Art

A variety of health services are being provided using electronic devices. An electronic device may be configured to be worn by a user, such as a watch or glasses. The electronic device, while being worn by the user, may acquire data about the user to identify the user's health condition. The electronic device may provide various services according to the identified health condition. For example, the electronic device may use a multiplicity of sensors to identify biometric information of the user. Based on the identified biometric information of the user, the electronic device may identify various activity states of the user.

The above information may be presented as related arts only to assist with an understanding of the present disclosure. No determination has been made, and no assertion is made, as to whether any of the aforementioned might be applicable as a prior art with regard to the disclosure.

SUMMARY

According to an embodiment, an electronic device may comprise: a photoplethysmography (PPG) sensor, a temperature sensor, a memory, and a processor operably coupled with the PPG sensor, the temperature sensor, and the memory. The processor may be configured to store first information on blood flow of a user obtained using the PPG sensor in the memory, as associated with second information on temperature of a part of the user's body obtained using the temperature sensor. The processor may be configured to, based on storing the first information as associated with the second information, change a state of the temperature sensor from an active state to an inactive state. The processor may be configured to, based on the PPG sensor monitoring the blood flow of the user and the state of the temperature sensor being maintained in the inactive state, identify that a first value representing the blood flow of the user is out of a first range set based on the first information. The processor may be configured to, in response to identifying that the first value representing the blood flow of the user is out of the first range, change the state of the temperature sensor from the inactive state to the active state. The processor may be configured to identify that a second value representing the temperature of the part of the user's body identified using the temperature sensor changed to the active state is out of a second range set based on the second information. The processor may be configured to, in response to identifying that the second value representing the temperature of the part of the user's body is out of the second range, provide a notification.

According to an embodiment, an electronic device may comprise: a temperature sensor, communication circuitry, a memory, and a processor operably coupled with the temperature sensor, communication circuitry, and the memory. The processor may be configured to obtain, from an external electronic device connected with the electronic device, first information on blood flow of a user. The processor may be configured to store the first information on the blood flow of the user in the memory, as associated with second information on temperature of a part of the user's body obtained using the temperature sensor. The processor may be configured to, based on storing the first information as associated with the second information, change a state of the temperature sensor from an active state to an inactive state. The processor may be configured to, based on the state of the temperature sensor being maintained in the inactive state, identify that a first value representing the blood flow of the user, received from the external electronic device monitoring the blood flow of the user, is out of a first range set based on the first information. The processor may be configured to, in response to identifying that the first value representing the blood flow of the user is out of the first range, change the state of the temperature sensor from the inactive state to the active state. The processor may be configured to identify that a second value representing the temperature of the part of the user's body, identified using the temperature sensor changed to the active state is out of a second range set based on the second information. The processor may be configured to, based on identifying that the second value representing the temperature of the part of the user's body is out of the second range, provide a notification.

According to an embodiment, a method of operating an electronic device may comprise storing first information on blood flow of a user obtained using a photoplethysmography (PPG) sensor of the electronic device in a memory of the electronic device, as associated with second information on temperature of a part of the user's body obtained using a temperature sensor of the electronic device. The method may comprise, based on storing the first information as associated with the second information, changing a state of the temperature sensor from an active state to an inactive state. The method may comprise, based on the PPG sensor monitoring the blood flow of the user and the state of the temperature sensor being maintained in the inactive state, identifying that a first value representing the blood flow of the user is out of a first range set based on the first information. The method may comprise, in response to identifying that the first value representing the blood flow of the user is out of the first range, changing the state of the temperature sensor from the inactive state to the active state. The method may comprise identifying that a second value representing the temperature of the part of the user's body identified using the temperature sensor changed to the active state is out of a second range set based on the second information. The method may comprise, in response to identifying that the second value representing the temperature of the part of the user's body is out of the second range, providing a notification.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
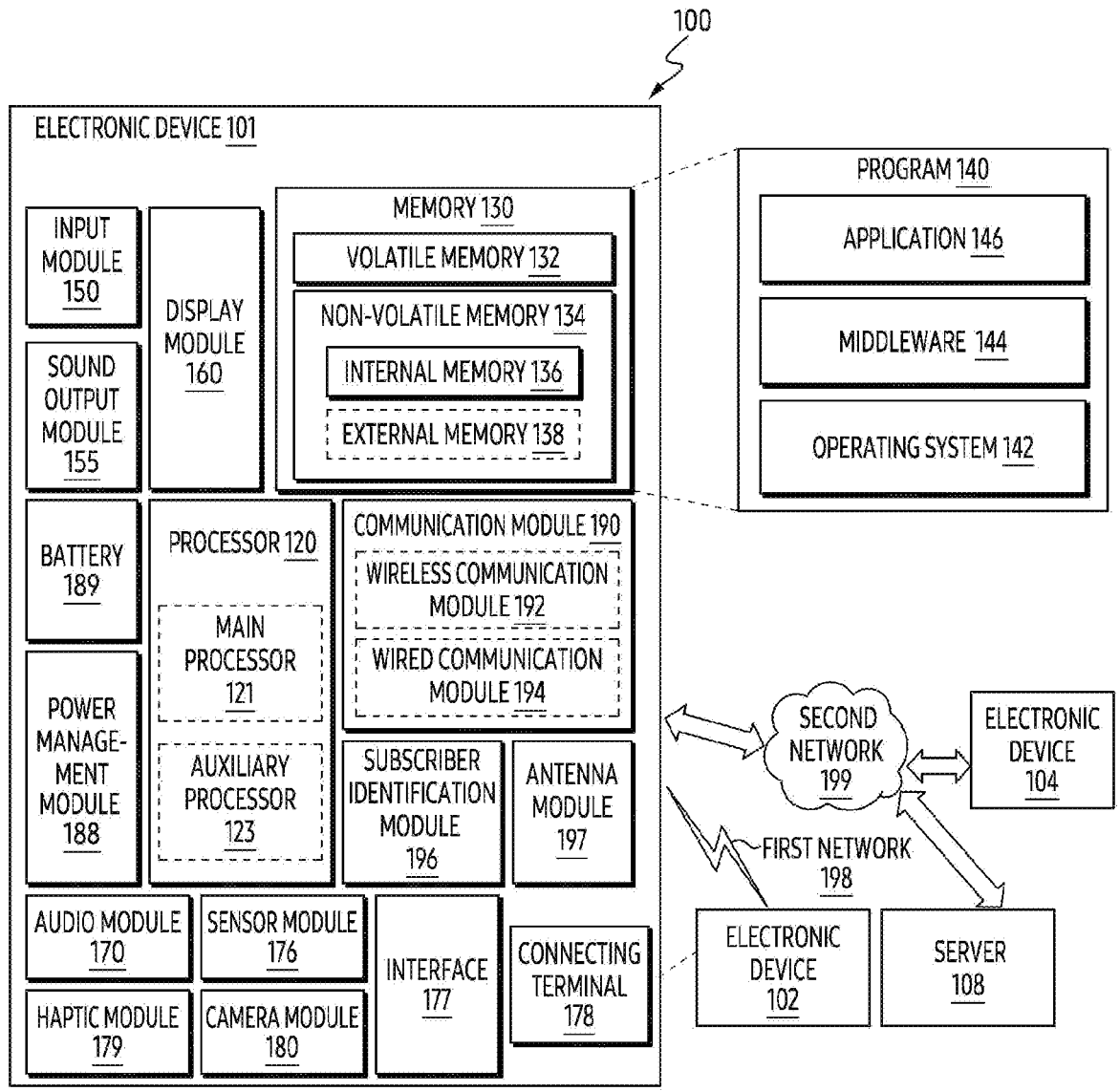
FIG. 1 is a block diagram of an electronic device in a network environment according to an embodiment.

Hereinafter, embodiments of the disclosure will be described in greater detail with reference to the accompanying drawings. The disclosure may be embodied in many different forms and should not be construed as being limited to the embodiments of the disclosure set forth herein. With respect to the detailed description of the drawings, identical or similar components may be designated by identical or similar reference numerals. Also, in the drawings and related descriptions, descriptions of well-known functions and constructions may be omitted for clarity and conciseness.

FIG. 1 is a block diagram illustrating an example electronic device in a network environment according to an embodiment.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an example, the electronic device 101 may communicate with the electronic device 104 via the server 108. According to an example, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an example, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an example, the auxiliary processor 123 (e.g., an image signal processor or a communication processor) may be implemented as part of another component (e.g., the camera module 180 or the communication module 190) functionally related to the auxiliary processor 123. According to an example, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an example, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an example, the display module 160 may include a touch sensor adapted to detect a touch, or a pressure sensor adapted to measure the intensity of force incurred by the touch.

The audio module 170 may convert a sound into an electrical signal and vice versa. According to an example, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an example, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an example, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an example, the haptic module 179 may include, for example, a motor, a piezoelectric element, or an electric stimulator.

The camera module 180 may capture a still image or moving images. According to an example, the camera module 180 may include one or more lenses, image sensors, image signal processors, or flashes.

The power management module 188 may manage power supplied to the electronic device 101. According to an example, the power management module 188 may be implemented as at least part of, for example, a power management integrated circuit (PMIC).

The battery 189 may supply power to at least one component of the electronic device 101. According to an example, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an example, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an example, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example, the antenna module 197 may include an antenna including a radiating element including a conductive material or a conductive pattern formed in or on a substrate (e.g., a printed circuit board (PCB)). According to an example, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to some embodiments, another component (e.g., a radio frequency integrated circuit (RFIC)) other than the radiating element may be additionally formed as part of the antenna module 197.

According to an embodiment, the antenna module 197 may form a mmWave antenna module. According to an example, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an example, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To this end, a cloud computing, distributed computing, mobile edge computing (MEC), or client-server computing technology may be used, for example. The electronic device 101 may provide ultra-low-latency services using, e.g., distributed computing or mobile edge computing. In another example of the disclosure, the external electronic device 104 may include an internet-of-things (IoT) device. The server 108 may be an intelligent server using machine learning and/or a neural network. According to an example, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
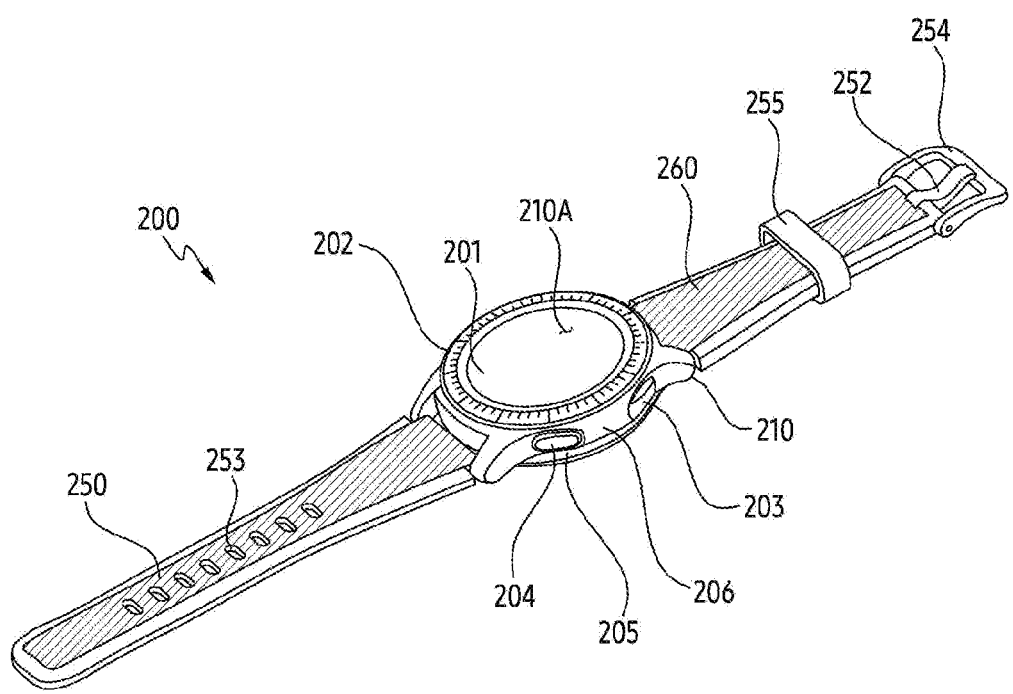
FIGS. 2A and 2B are respectively front and rear perspective views of an example electronic device according to an embodiment.
Figure 2B:
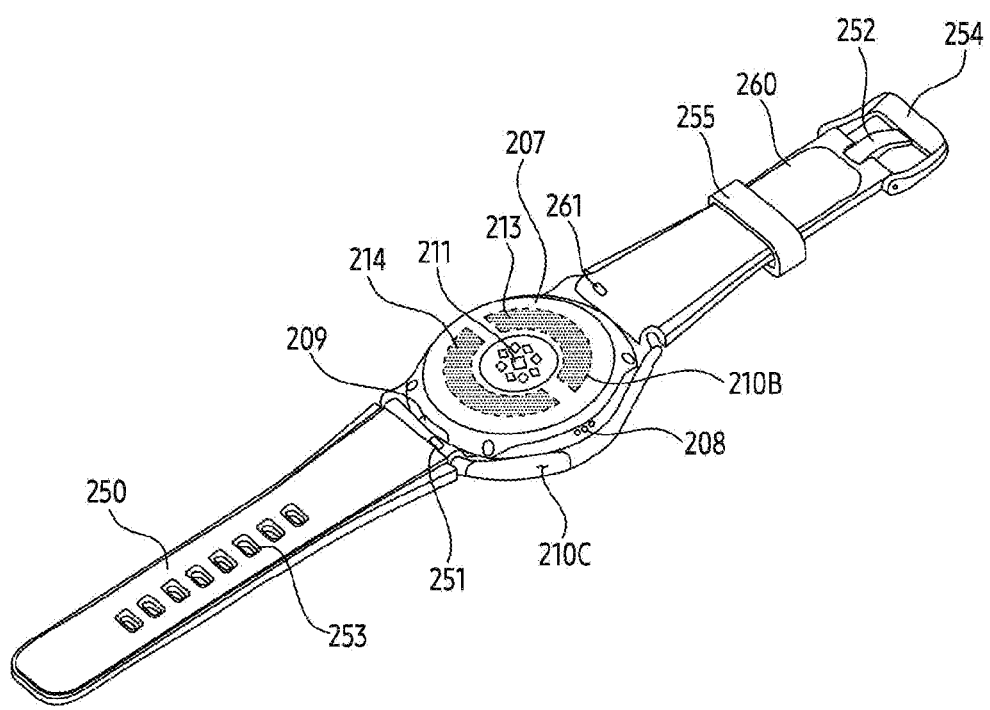

FIGS. 2A and 2B are respectively front and rear perspective views of an electronic device according to an embodiment.

Referring to FIGS. 2A and 2B, according to an embodiment, an electronic device 200 (e.g., the electronic device 101 of FIG. 1) may include a housing 210A including a first surface (or a front surface) 210A, a second surface (or a rear surface) 210B, and a side surface 210C surrounding a space between the first surface 210A and the second surface 210B, and binding members 250 and 260 (e.g. straps) connected to at least a part of the housing 210 and detachably couple the electronic device 200 to a part of a user's body (e.g., a wrist, an ankle, etc.). In an embodiment (not illustrated), the housing may refer to a structure forming some of the first surface 210A, the second surface 210B, and the side surface 210C of FIGS. 2A and 2B. According to an embodiment, at least a part of the first surface 210A may be formed by a substantially transparent front plate 201 (e.g., a glass plate including various coating layers, or a polymer plate). The second surface 210B may be formed by a substantially opaque rear plate 207. For example, the rear plate 207 may be formed by coating or colored glass, ceramic, polymer, metal (e.g. aluminum, stainless steel (STS), or magnesium), or a combination of at least two of the materials. The side surface 210C may be formed by a side bezel structure (or "side member") 206 coupled to the front plate 201 and the rear plate 207 and including a metal and/or a polymer. In some embodiments, the rear plate 207 and the side bezel structure 206 may be integrally formed and may include the same material (e.g., a metal material such as aluminum). The binding members 250 and 260 may be formed of various materials and shapes. An integral unit link and a plurality of unit links may be formed to flow with each other by a woven fabric, leather, rubber, urethane, metal, ceramic, or a combination of at least two of the materials.

According to an embodiment, the electronic device 200 may include at least one of a display 220 (refer to FIG. 3), audio modules (e.g., including audio circuitry) 205 and 208, a sensor module (e.g., including at least one sensor) 211, key input devices 202, 203 and 204, and a connector hole 209. In some embodiments, the electronic device 200 may omit at least one (e.g., key the input devices 202, 203 and 204, the connector hole 209, or the sensor module 211) of the components or may additionally include another component.

The display 220 may be visually exposed (e.g., visible), for example, through a substantial part of the front plate 201. The shape of the display 220 may be a shape corresponding to the shape of the front plate 201, and may have various shapes such as a circle, an ellipse, or a polygon. The display 220 may be coupled to, or disposed adjacent to, a touch detecting circuit, a pressure sensor capable of measuring the intensity (pressure) of a touch, and/or a fingerprint sensor.

The audio modules 205 and 208 may include various audio circuitry and a microphone hole 205 and a speaker hole 208. In the microphone hole 205, a microphone for obtaining an external sound may be disposed inside, and in some embodiments, a plurality of microphones may be disposed to detect the direction of the sound. The speaker hole 208 may be used as an external speaker and a receiver for calls. In some embodiments, the speaker hole 208 and the microphone hole 205 may be implemented as one hole, or a speaker may be included without the speaker hole 208 (e.g., a piezo speaker).

The sensor module 211 may include at least one sensor and generate an electrical signal or data value corresponding to an internal operating state of the electronic device 200 or an external environmental state. The sensor module 211 may include, for example, a biometric sensor module 211 (e.g., an HRM sensor) disposed on the second surface 210B of the housing 210. The electronic device 200 may further include at least one of a sensor module not illustrated, for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illumination sensor.

The sensor module 211 may include electrode regions 213 and 214 forming a part of the surface of the electronic device 200 and a bio-signal detection circuit (not illustrated) electrically connected to the electrode regions 213 and 214. For example, the electrode regions 213 and 214 may include a first electrode region 213 and a second electrode region 214 disposed on the second surface 210B of the housing 210. The sensor module 211 may be configured such that the electrode regions 213 and 214 obtain an electrical signal from a part of the user's body, and a bio-signal detection circuit detects bio-information of the user based on the electrical signal.

The key input devices 202, 203, and 204 may include a wheel key 202 disposed on the first surface 210A of the housing 210 and rotatable in at least one direction, and/or side key buttons 203 and 204 disposed on the side surface 210C of the housing 210. The wheel key may have a shape corresponding to the shape of the front plate 201. In an embodiment, the electronic device 200 may not include some or all of the above-described key input devices 202, 203, and 204, and the not included key input devices 202, 203, and 204 may be implemented in other forms such as a soft key on the display 220. The connector hole 209 may accommodate connectors (e.g., USB connectors) for transmitting and receiving power and/or data to and from external electronic devices, and include another connector hole (not illustrated) capable of accommodating a connector for transmitting and receiving audio signals to and from an external electronic device. For example, the electronic device 200 may further include a connector cover (not illustrated) that covers at least a part of the connector hole 209 and blocks the inflow of external foreign materials into the connector hole.

The binding members 250 and 260 may be detachably attached to at least a part of the housing 210 using locking members 251 and 261. The binding members 250 and 260 may include one or more of a fixing member 252, a fixing member fastening hole 253, a band guide member 254, and a band fixing ring 255.

The fixing member 252 may be configured to fix the housing 210 and the binding members 250 and 260 to a part of the user's body (e.g., a wrist, an ankle, etc.). Corresponding to the fixing member 252, the fixing member fastening hole 253 may fix the housing 210 and the binding members 250 and 260 to a part of the user's body. The band guide member 254 may be configured to limit a movement range of the fixing member 252 when the fixing member 252 is fastened to the fixing member fastening hole 253, and thus the binding members 250 and 260 may be closely coupled to a part of the user's body. In a state in which the fixing member 252 and the fixing member fastening hole 253 are fastened, the band fixing ring 255 may limit the movement range of the binding members 250 and 260.

Figure 3:
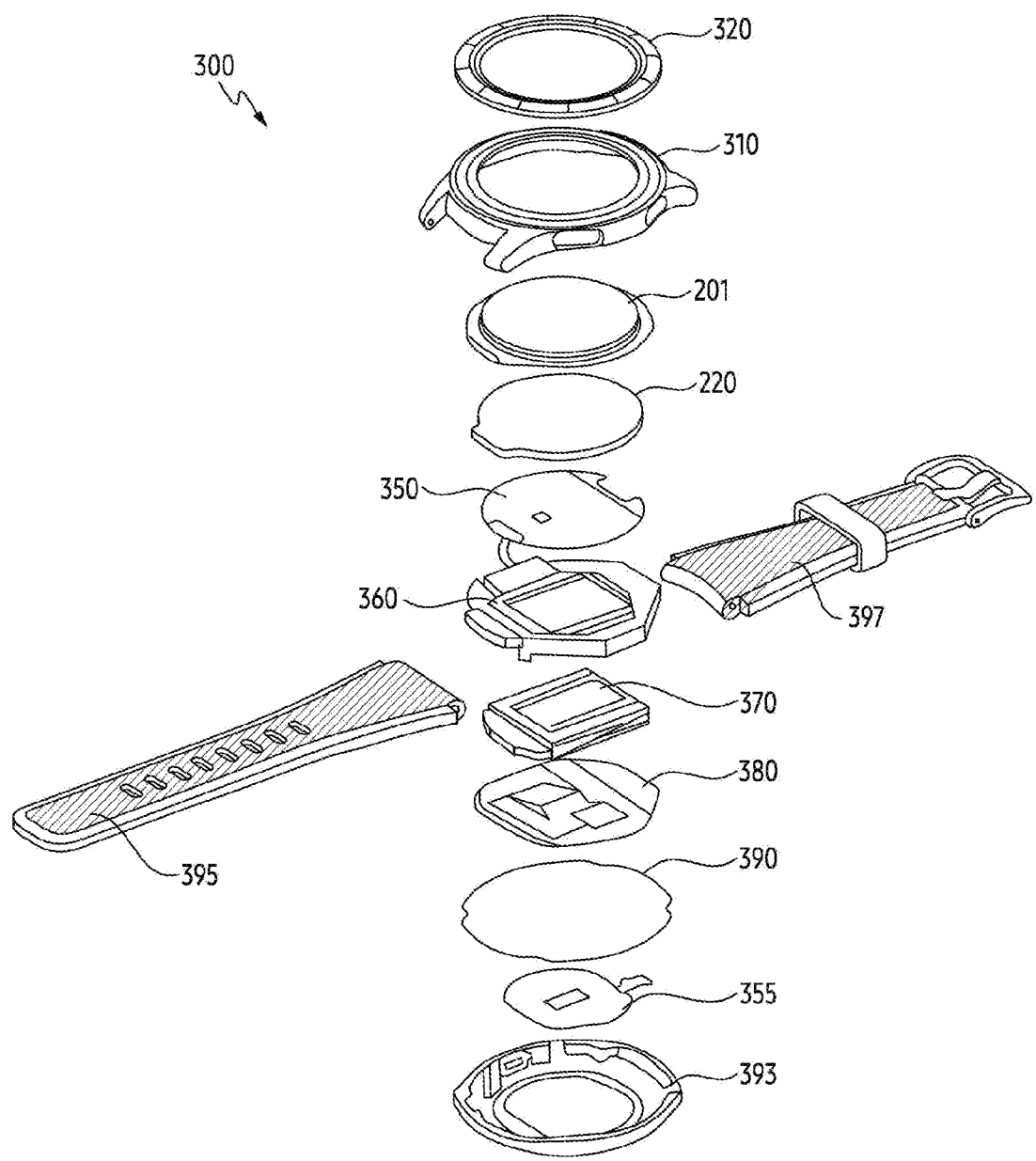
FIG. 3 is an exploded perspective view of an example electronic device according to an embodiment.

FIG. 3 is an exploded perspective view of an example electronic device according to an embodiment.

Referring to FIG. 3, the electronic device 300 (e.g., the electronic device 101 of FIG. 1 or the electronic device 200 of FIGS. 2A to 2B) may include a side bezel structure 310, a wheel key 320, a front plate 201, a display 220, a first antenna 350, a second antenna 355, and a support member 360 (e.g., a bracket), a battery 370, a printed circuit board 380, a sealing member (e.g., a seal) 390, a rear plate 393, and binding members 395 and 397 (e.g., the binding members 250 and 260 of FIGS. 2A and 2B). At least one of the components of the electronic device 300 may be the same as, or similar to, at least one of the components of the electronic device 200 of FIGS. 1 and 2A to 2B, and a repeated description thereof will be omitted. The support member 360 may be disposed inside the electronic device 300 to be connected to the side bezel structure 310 or may be integrally formed with the side bezel structure 310. The support member 360 may be formed of, for example, a metal material and/or a non-metal (e.g., a polymer) material. In the support member 360, the display 220 may be coupled to one surface and the printed circuit board 380 may be coupled to the other surface. A processor, a memory, and/or an interface may be mounted on the printed circuit board 380. The processor may include, for example, one or more of a central processing unit, a graphic processing unit (GPU), an application processor, a sensor processor, or a communication processor.

The memory may include, for example, a volatile memory or a nonvolatile memory. The interface may include, for example, a high definition multimedia interface (HDMI), a universal serial bus (USB) interface, an SD card interface, and/or an audio interface. For example, the interface may electrically or physically connect the electronic device 300 to an external electronic device, and may include a USB connector, an SD card/MMC connector, or an audio connector.

The battery 370 is a device for supplying power to at least one component of the electronic device 300, and may include, for example, a non-rechargeable primary battery, a rechargeable secondary battery, or a fuel battery. At least a part of the battery 370 may be disposed on substantially the same plane as, for example, the printed circuit board 380. The battery 370 may be integrally disposed inside the electronic device 200 or may be detachably disposed from the electronic device 200.

The first antenna 350 may be disposed between the display 220 and the support member 360. The first antenna 350 may include, for example, a near field communication (NFC) antenna, a wireless charging antenna, and/or a magnetic secure transmission (MST) antenna. For example, the first antenna 350 may perform short-range communication with an external device, wirelessly transmit and receive power required for charging, and may transmit a short-range communication signal or a self-based signal including payment data. In an embodiment, an antenna structure may be formed by the side bezel structure 310 and/or a part of the support member 360 or a combination thereof.

The second antenna 355 may be disposed between the printed circuit board 380 and the rear plate 393. For example, the second antenna 355 may include a near field communication (NFC) antenna, a wireless charging antenna, and/or a magnetic secure transmission (MST) antenna. For example, the second antenna 355 may perform short-range communication with an external device, wirelessly transmit and receive power required for charging, and may transmit a short-range communication signal or a self-based signal including payment data. In an embodiment, an antenna structure may be formed by the side bezel structure 310 and/or a part of the rear plate 393 or a combination thereof.

The sealing member 390 may be positioned between the side bezel structure 310 and the rear plate 393. The sealing member 390 may be configured to block moisture and foreign substances from flowing into the space surrounded by the side bezel structure 310 and the rear plate 393 from the outside.

Figure 4:
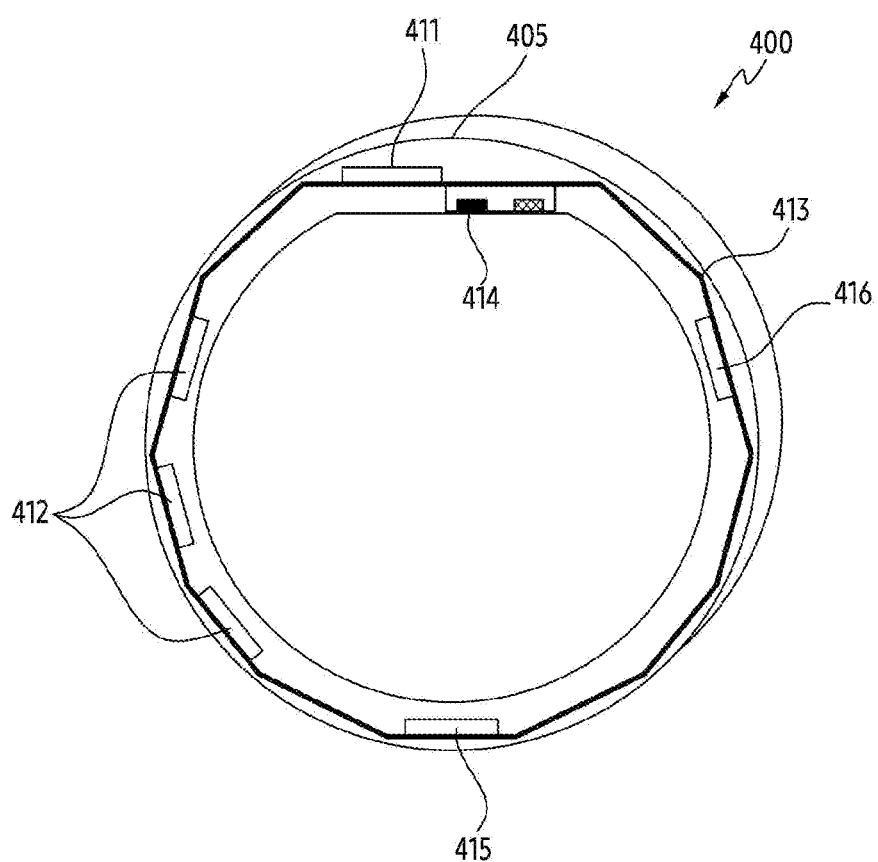
FIG. 4 is a partial cross-sectional view of an example electronic device according to an embodiment.

FIG. 4 is a partial cross-sectional view of an example electronic device according to an embodiment.

Referring to FIG. 4, an electronic device 400 (e.g., the electronic device 101 of FIG. 1) may be formed in a ring shape. For example, a housing 405 of the electronic device 400 may be formed in the shape of a ring that may be worn on a user's finger. Although FIG. 4 shows the electronic device 400 in the form of a ring with a smooth surface, the disclosure is not limited thereto. For example, the electronic device 400 may be implemented as a housing having a plurality of planes. For example, a ring-shaped electronic device 400 with a non-smooth surface may be also understood as an example embodiment of the present disclosure.

According to an embodiment, the ring-shaped housing 405 may include an outer surface exposed to the outside while worn by a user, an inner surface in contact with the user's body part, and a side surface between the outer surface and the inner surface. Between the inner and outer surfaces of the housing 405 may be included a space for accommodating at least one component, such as a processor (e.g., including processing circuitry) 411, a battery 412, a printed circuit board (PCB) 413, a photoplethysmography (PPG) sensor 414, a temperature sensor 415, and/or communication circuitry 416. For example, the housing 405 may include a plurality of layers between the inner and outer surfaces. For example, components included in the electronic device 400 may be located in one layer or a plurality of layers and may be connected by means of structures for connection, such as a connecting member (not shown).

According to an embodiment, the electronic device 400 may include the housing 405, a processor 411, a battery 412, a printed circuit board (PCB) 413, a photoplethysmography (PPG) sensor 414, a temperature sensor 415, and/or communication circuitry 416.

According to an embodiment, the PCB 413 may be disposed between an inner surface and an outer surface of the housing 405. For example, the processor 411, the battery 412, the PPG sensor 414, the temperature sensor 415, and/or the communication circuitry 416 may be arranged on PCB 413. For example, PCB 413 may include a rigid region and a flexible region. In an example, the rigid region may be referred to as a rigid flexible printed circuit board (RFPCB). In an example, the flexible region may be referred to as a flexible printed circuit board (FPCB).

According to an embodiment, the battery 412 may include at least one battery. The ring-shaped electronic device 400 may lack for space for mounting the battery 412. The battery 412 may be configured such that the at least one battery is connected in series and/or parallel.

According to an embodiment, the electronic device 400 may include at least one sensor. For example, the electronic device 400 may include the PPG sensor 414 and/or the temperature sensor 415. The PPG sensor 414 and/or the temperature sensor 415 may be disposed toward an inner surface of the electronic device 400 to obtain biometric information about a part of the user's body (e.g., a finger).

For example, the PPG sensor 414 may be disposed toward a first part of the user's body in a layer between the inner surface and the outer surface. For example, the temperature sensor 415 may be disposed toward a second part of the user's body in the layer between the inner surface and the outer surface.

According to an embodiment, the electronic device 400 may include the communication circuitry 416 for performing communications with an external electronic device. For example, the communication circuitry 416 may be electrically connected to an antenna (or antenna radiator) via the PCB 413.

Although not shown herein, the electronic device 400 may further include various other components in addition to the components shown herein. For example, the electronic device 400 may include a display. The display may be disposed on an outermost surface of the housing 405.

According to an embodiment, the electronic device (e.g., the electronic device 101 of FIG. 1, the electronic device 200 of FIGS. 2A and 2B, the electronic device 300 of FIG. 3, and the electronic device 400 of FIG. 4) may be operable while worn on a user. The electronic device may identify biometric information (e.g., pulse or body temperature) about the user, using at least one sensor included in the electronic device. If all of one or more sensors included in the electronic device are activated, their current consumption may increase, thus in turn increasing the battery consumption. Accordingly, the electronic device may change the state of the at least one sensor to an active state, based on a specified condition.

Hereinafter, description will be made of example operation of the electronic device according to an embodiment. The electronic device described below may correspond to the electronic device 101 of FIG. 1, the electronic device 200 of FIGS. 2A and 2B, the electronic device 300 of FIG. 3, and/or the electronic device 400 of FIG. 4. For example, the electronic device may be implemented in various forms that can be worn by a user, such as e.g., a smart watch, a smart band, a smart ring, a wireless earphone, or smart glasses.

Figure 5:
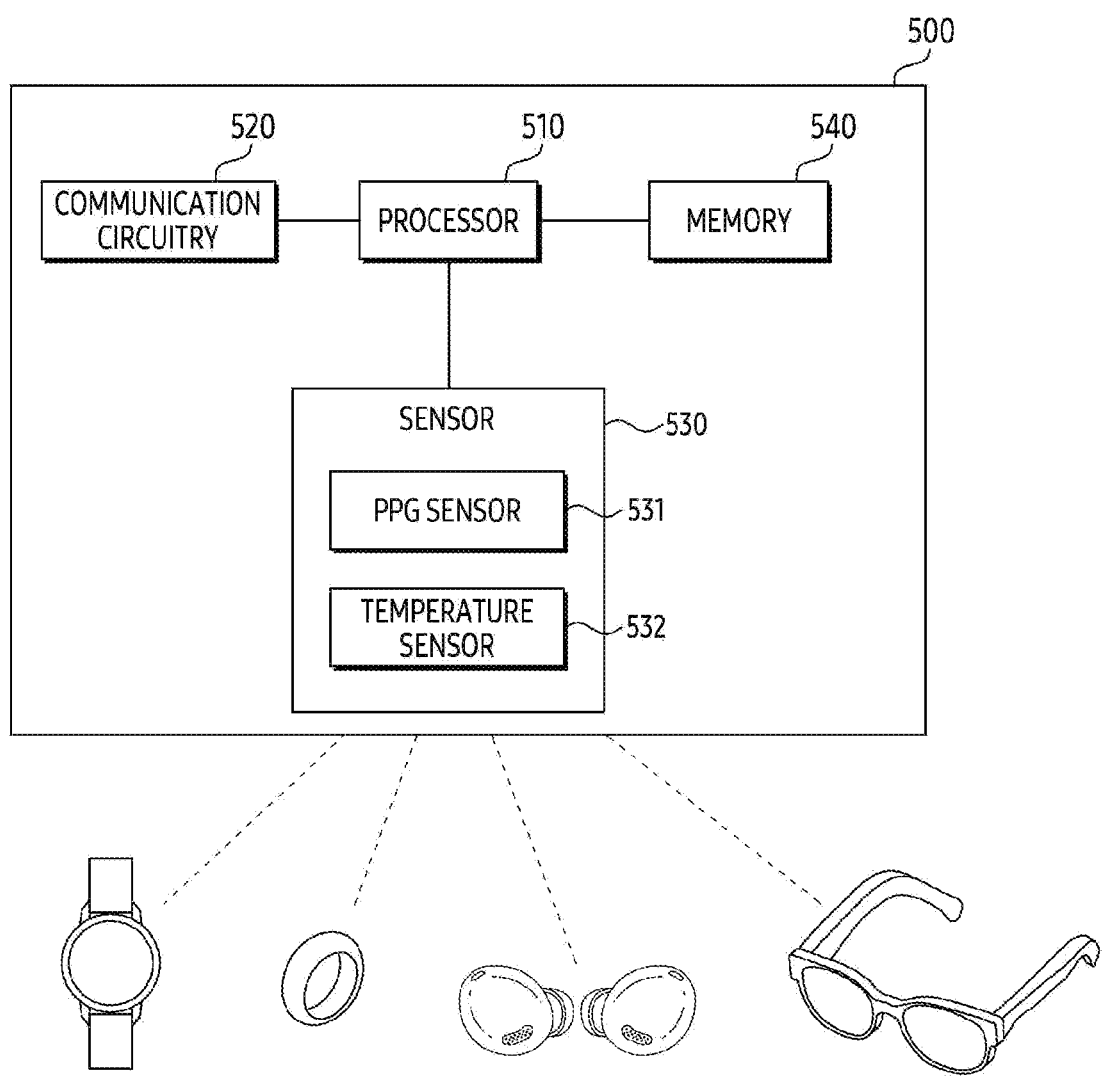
FIG. 5 is a block diagram illustrating an example configuration of an example electronic device according to an embodiment.

FIG. 5 is a block diagram illustrating an example configuration of an example electronic device according to an embodiment.

Referring to FIG. 5, an electronic device 500 may correspond to the electronic device 101 of FIG. 1, the electronic device 200 of FIGS. 2A and 2B, the electronic device 300 of FIG. 3, and/or electronic device 400 of FIG. 4.

According to an embodiment, the electronic device 500 may include a processor (e.g., including processing circuitry) 510, communication circuitry 520, a sensor 530, and/or a memory 540. According to an embodiment, the electronic device 500 may include at least one of the processor 510, the communication circuitry 520, the sensor 530, and/or the memory 540. For example, at least some of the processor 510, the communication circuitry 520, the sensor 530, and/or the memory 540 may be omitted according to various embodiments.

According to an embodiment, the processor 510 may include various processing circuitry and correspond to the processor 120 of FIG. 1. The processor 510 may be operatively coupled with, or connected to, the communication circuitry 520, the sensor 530, and/or the memory 540. When the processor 510 is operatively coupled with or connected to the communication circuitry 520, the sensor 530, and/or the memory 540, it may refer, for example, to the processor 510 controlling the communication circuitry 520, the sensor 530, and/or the memory 540. For example, the communication circuitry 520, the sensor 530, and/or the memory 540 may be controlled by the processor 510.

According to an embodiment, the processor 510 may include at least one processor. For example, the processor 510 may include a main processor for performing high-performance processing and an auxiliary secondary processor for performing low-power processing. At least some of the sensors 530 may be connected to the auxiliary processor. At least some of the sensors connected to the auxiliary processor may acquire data about the user for 24 hours a day. According to an embodiment, depending on the state and/or the operation of the electronic device 500, one of the main processor and the auxiliary processor may be activated. In an example, the auxiliary processor may be activated in a state that the battery of the electronic device 500 goes low. In an example, the main processor may be activated in a state where accurate data about a user is required.

According to an embodiment, the processor 510 may include hardware components for processing data based on one or more instructions. The hardware components for processing data may include, for example, an arithmetic and logic unit (ALU), a field programmable gate array (FPGA), and/or a central processing unit (CPU).

According to an embodiment, the processor 510 may determine when the sensor 530 is actuated. The processor 510 may control operation of the sensor 530. The processor 510 may process information obtained from the sensor 530. For example, the processor 510 may use the sensor 530 to obtain (or identify) data about a user. Based on the obtained data about the user, the processor 510 may identify a body temperature of the user. Hereinafter, an example of operation of the processor 510 to obtain data about a user and identify the user's body temperature based on the data about the user will be described.

According to an embodiment, the electronic device 500 may include various communication circuitry 520. The communication circuitry 520 may correspond to at least a portion of the communication module 190 of FIG. 1. For example, the communication circuitry 520 may be used for various radio access technologies (RATs). For example, the communication circuitry 520 may be used to perform Bluetooth communication or wireless local area network (WLAN) communication. For example, the communication circuitry 520 may be used to perform cellular communication. For example, the processor 510 may establish a connection with an external electronic device via the communication circuitry 520. For example, the processor 510 may utilize the communication circuitry 520 to identify (or measure) a location of the electronic device 500 based on wireless signals received or transmitted.

According to an embodiment, the electronic device 500 may include a sensor 530. The sensor 530 may be used to obtain various information. For example, the sensor 530 may be used to obtain data about a user's body. In an example, the sensor 530 may be used to acquire data on body temperature, heart rate, and/or motion of a user. For example, the sensor 530 may be configured of at least one sensor. The sensor 530 may include at least one sensor. For example, the sensor 530 may correspond to the sensor module 176 of FIG. 1.

The sensors 530 may include biometric sensors. The sensor 530 may be used to identify (or detect) at least one of blood pressure, electrocardiogram, heart rate variability (HRV), heart rate monitor (HRM), photoplethysmography (PPG), sleep zone, skin temperature, heart rate, blood flow, blood sugar, oxygen saturation, pulse wave, and/or electrocardiogram (ECG). For example, the processor 510 may obtain, via the sensor 530, a waveform of bio-signals, based on the PPG or ECG. For example, the bio-signal may include a light pulse wave, a pulse wave, or an electrocardiogram. Based on the waveform of the bio-signal, the processor 510 can identify at least one of blood pressure, HRV, HRM, skin temperature, blood flow, blood glucose, and oxygen saturation.

According to an embodiment, the sensors 530 may include a PPG sensor 531 and a temperature sensor 532.

The PPG sensor 531 may be used to measure a pulse (or a change in blood volume in a blood vessel) by identifying a change in a photosensitive amount of light according to a change in blood vessel volume. The PPG sensor 531 may include one or more photodiodes (PDs) and one or more light emitting diodes (LEDs). For example, the PPG sensor 531 may be used to identify a change in blood flow in a blood vessel during a heartbeat. The PPG sensor 531 may identify a change in blood flow in a blood vessel due to heartbeat, while an optical sensor is in contact with skin over a peripheral blood vessel. Based on the PPG signal and waveform, the processor 510 may identify an amount of blood flow and a change in the amount of blood flow.

For example, the PPG sensor 531 may include a transmissive PPG sensor and/or a reflective PPG sensor. In an example, the transmissive PPG sensor may output light toward the user's skin through an LED (e.g., green, red, or infrared (IR) LED). The transmissive PPG sensor may identify light transmitted through a blood vessel, through the photodiode (PD) disposed opposite the LED. The transmissive PPG sensor may identify the user's blood flow based on the intensity of light transmitted through the blood vessel. In an example, the reflective PPG sensor may output light through the LED onto the user's skin. The reflective PPG sensor may identify at least some of the received light reflected by the blood vessel, via a PD disposed on substantially the same plane as the LED. Based on the intensity of the light reflected by the blood vessel, the reflective PPG sensor may identify an amount of the user's blood flow. For example, a multi-light source may be used as the LED. For example, green light of LED may be used, which is a complementary color to blood color.

The temperature sensor 532 may be used to identify (or measure) skin temperature at a part of the user's body (e.g., wrist or forehead). For example, the temperature sensor 532 may include a contact-type temperature sensor and a non-contact type temperature sensor. For example, a skin temperature measured on a part a user's body may be different from that a body temperature of the user. The processor 510 may calibrate the skin temperature measured at a part of the user's body (e.g., a wrist) to the body temperature of the user. For example, the body temperature of the user may refer to a temperature measured inside a human body cavity, such as pulmonary artery, esophagus, bladder, ear canal, or rectum.

According to an embodiment, the temperature sensor 532 may operate in an active state based on a specified period.

For example, activation of the temperature sensor 532 may imply that the temperature sensor 532 is changed from a sleep state to an awake state. Deactivation of the temperature sensor 532 may imply that the temperature sensor 532 is changed from the awake state to the sleep state.

For example, the activating of the temperature sensor 532 may refer, for example, to the temperature sensor 532 sensing temperatures. The deactivating of the temperature sensor 532 may refer, for example, to the temperature sensor 532 not sensing any temperature. For example, a cycle for changing the state of the temperature sensor 532 from an activated (enabled) state to a deactivated (disabled) state may refer to a sensing cycle.

Although not shown herein, the sensor 530 may further include various sensors for obtaining (or identifying, measuring, or detecting) various data about the user.

For example, the sensor 530 may include a proximity sensor. The proximity sensor may be used to identify whether an external object closely approaches the electronic device 500. The proximity sensor may include a light-emitting component and a light-receiving component. The light-receiving component may be configured to receive infrared light reflected from an external object after the infrared light is emitted from the light-emitting component. The proximity sensor may be configured to identify a distance between the electronic device 500 (or the proximity sensor) and the external object, based on the infrared light received through the light-receiving component.

For example, the sensor 530 may include a motion sensor. The motion sensor may be used to obtain data (e.g., a value for motion) about the motion of the electronic device 500 (or the user). In an example, the motion sensor may include an acceleration sensor, a gyro sensor, a geomagnetic sensor, or a barometric pressure sensor. The acceleration sensor may identify (or measure, detect) acceleration of the electronic device 500 in three directions, such as x-axis, y-axis, and z-axis, for example. The gyro sensor may identify (or measure, detect) an angular velocity of the electronic device 500 in the three directions of x-axis, y-axis, and z-axis. The geomagnetic sensor may identify a geomagnetic field to identify (or measure, detect) values for a bearing. The barometric pressure sensor may identify (or measure, detect) a barometric pressure around the electronic device 500.

For example, the sensor 530 may include a HRV sensor. The processor 510 may measure, via the HRV sensor, regularity or variability of the heart rate. The processor 410 may obtain information about the regularity or variability of the heart rate with the HRV sensor.

For example, the sensor 530 may include a blood glucose sensor. By identifying (or measuring) a current generated by an electrochemical reaction with glucose in the blood, the processor 510 may identify a level of the user's blood glucose.

According to an embodiment, the electronic device 500 may include a memory 540. The memory 540 may be used to store information or data. For example, the memory 540 may be used to store data obtained from a user. For example, the memory 540 may correspond to the memory 130 of FIG. 1. For example, the memory 540 may be a volatile memory unit or units. For example, the memory 540 may be a non-volatile memory unit or units. In another example, the memory 540 may be another form of computer-readable medium, such as a magnetic or optical disk. For example, the memory 540 may store data obtained based on operations performed on the processor 510 (e.g., an operation to execute a certain algorithm). For example, the memory 540 may store data obtained from the sensor 530 (e.g., body temperature data).

Figure 6A:
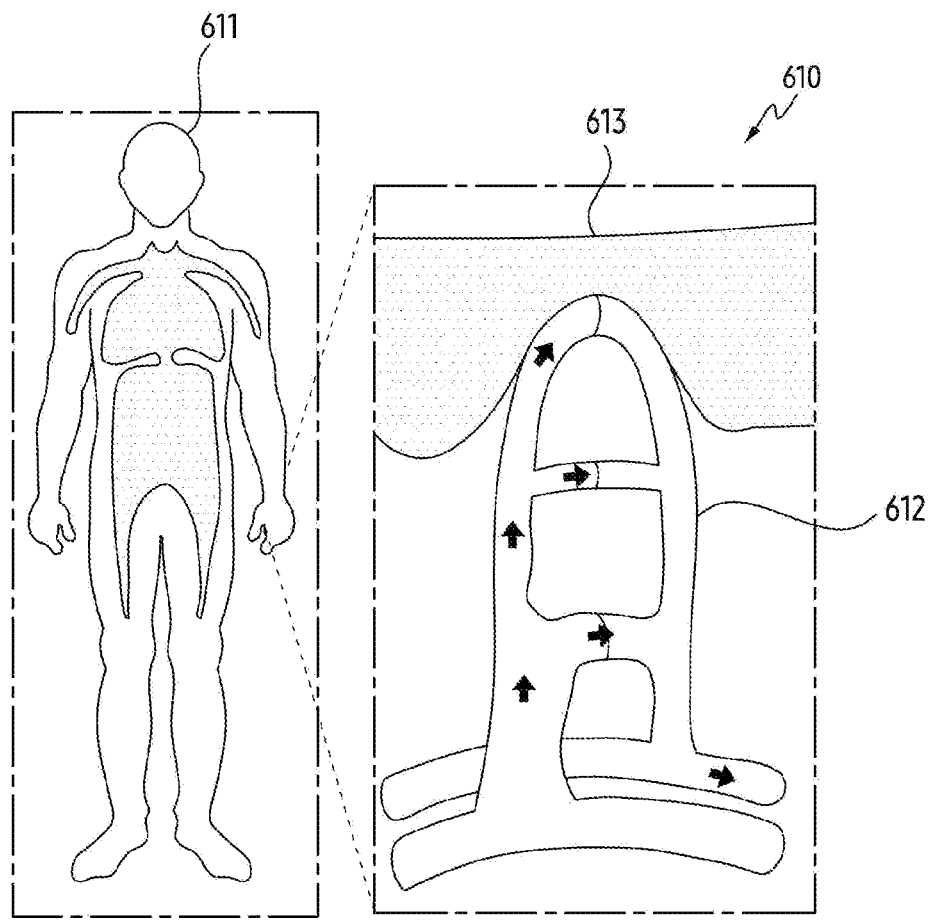
FIGS. 6A and 6B are diagrams illustrating an example of variation in blood flow according to an ambient temperature according to an embodiment.
Figure 6B:
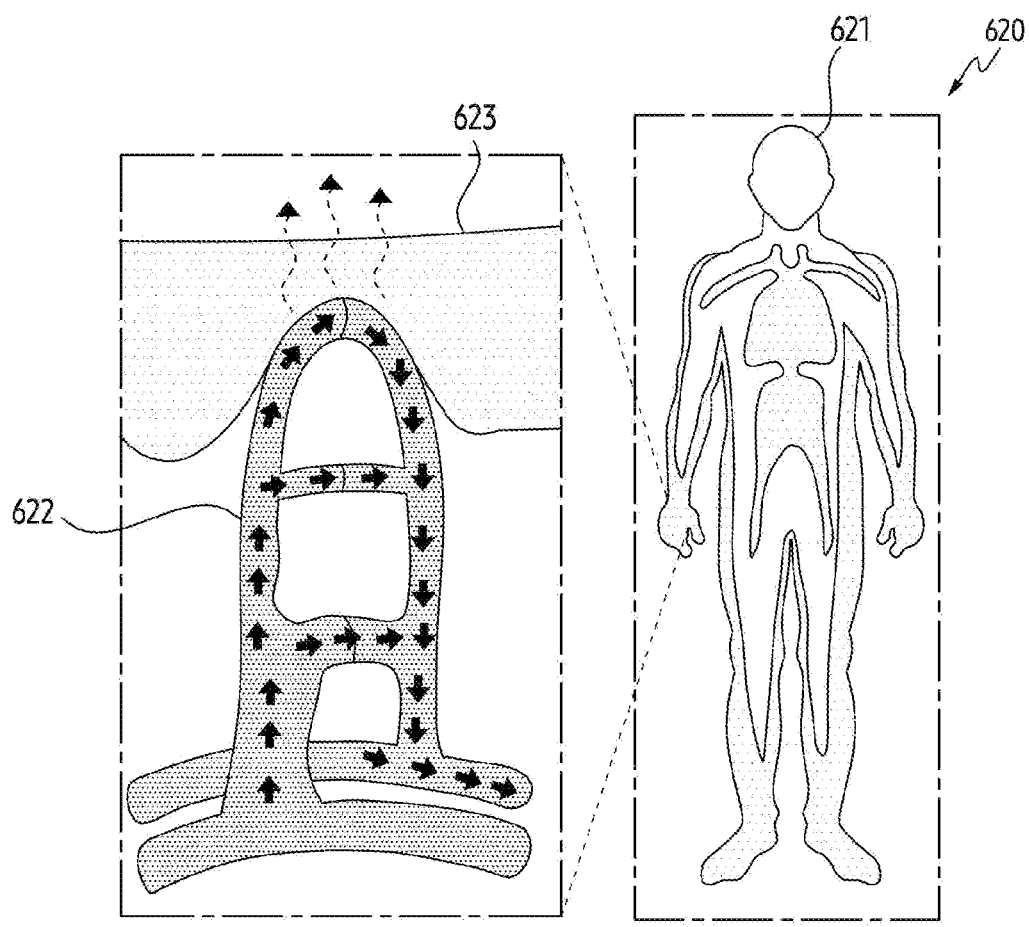

FIGS. 6A and 6B are diagrams illustrating examples of changes in blood flow according to an ambient temperature according to an embodiment. FIG. 6A may represent the amount of blood flow in a body and capillaries when the ambient temperature is low. FIG. 6B may represent the amount of blood flow in the body and capillaries when the ambient temperature is high.

Referring to FIG. 6A, in state 610, the ambient temperature of the user may be low. For example, the ambient temperature may be lower than the user's body temperature. In case where the temperature of the skin changes as the ambient temperature changes, the body temperature may be maintained with hypothalamus in the interbrain and autonomic nervous hormones. When the ambient temperature is lower than the user's body temperature, the blood flow near the skin, such as in a body 611, may decrease.

For example, when the ambient temperature is lower than the body temperature of the user, the capillaries 612 near the skin 613 of the hand (or finger), which is an extremity of the body 611 may contract. As the capillaries 612 constrict, the blood flow may be reduced, thus reducing heat dissipation. The processor (e.g., the processor 510 of FIG. 5) of the electronic device (e.g., the electronic device 500 of FIG. 5) may identify decrease in blood flow using a PPG sensor (e.g., the PPG sensor 531 in FIG. 5) facing the skin 613. Based on identifying the decreased blood flow, the processor 510 may identify the user's body temperature (or the temperature of the skin).

Referring to FIG. 6B, in state 620, the user's ambient temperature may be high. For example, the ambient temperature may be higher than the user's body temperature. In case where the temperature of the skin changes as a result of change in the ambient temperature, the body temperature may be maintained with the hypothalamus in the interbrain and autonomic nervous hormones. In case where the ambient temperature is higher than the user's body temperature, the blood flow near the skin, such as in a body 621, may increase.

For example, when the ambient temperature is higher than the user's body temperature, the capillaries 622 near the skin 623 of the hand (or finger), which is an extremity of the body 621 may relax. As the capillaries 622 relax, the blood flow may increase, thus increasing heat dissipation. The processor 510 of the electronic device 500 may identify the increased blood flow, using the PPG sensor 531 facing the skin 623. Based on identifying the increased blood flow, the processor 510 may identify the user's body temperature (or skin temperature).

Figure 7:
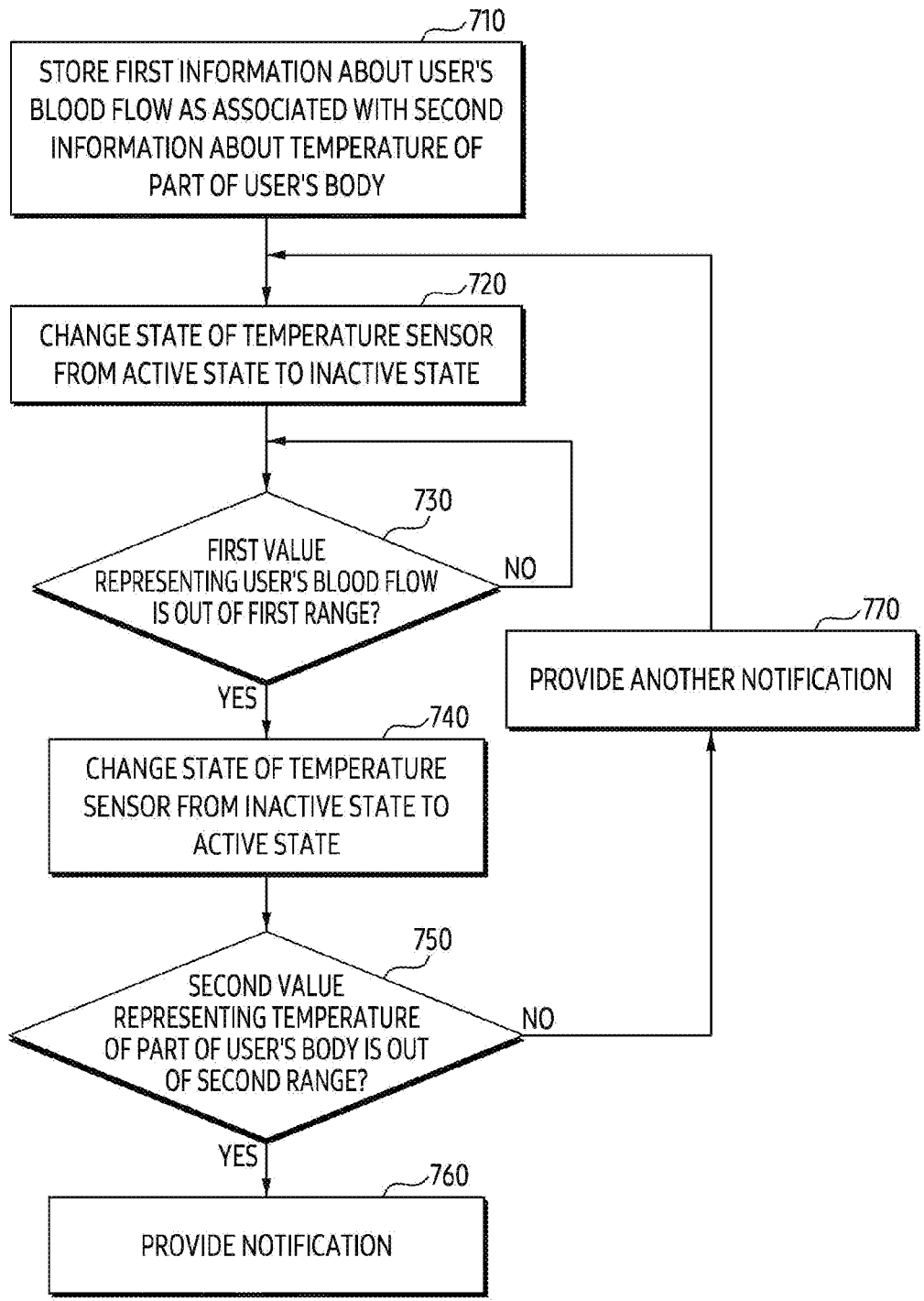
FIG. 7 is a flowchart illustrating example operation of an electronic device, according to an embodiment.

FIG. 7 is a flowchart illustrating example operations of an example electronic device according to an embodiment.

In the following embodiments, each of the operations may be executed sequentially, but may not be necessarily executed sequentially. For example, the execution sequence of the operations may be changed, and at least two of the operations may be performed in parallel.

According to an embodiment, operations 710 through 770 may be understood to be performed, for example, by a processor (e.g., the processor 510 of FIG. 5) of the electronic device (e.g., the electronic device 500 of FIG. 5).

Referring to FIG. 7, in operation 710, the processor 510 may store first information about a user's blood flow in association with second information about a temperature of a part of the user's body. For example, the processor 510 may store the first information about the user's blood flow obtained using the PPG sensor (e.g., the PPG sensor 531 of FIG. 5) in the memory (e.g., the memory 540 of FIG. 5) in association with the second information about the temperature of a part of the user's body obtained using the temperature sensor (e.g., the temperature sensor 532 of FIG. 5).

According to an embodiment, the processor 510 may use the PPG sensor 531 to obtain the first information about the user's blood flow. For example, the processor 510 may use the PPG sensor 531 to obtain the first information about the user's blood flow when the user is in a stable state (e.g., no movement of the user being detected, or a movement below a threshold value being detected).

For example, the processor 510 may use the PPG sensor 531 to monitor the user's blood flow. The processor 510 may utilize the PPG sensor 531 to identify a change in the user's blood flow. For example, the processor 510 may use the PPG sensor 531 to identify the user's perfusion index (PI). The term 'perfusion index' refers to a ratio of pulsatile blood flow to non-pulsatile static blood flow in peripheral tissues (e.g., fingertips, toes, ears). Based on the user's perfusion index, the processor 510 may identify the first information about the user's blood flow. A specific example of the processor 510 identifying the user's perfusion index (PI) using the PPG sensor 531 will be described in greater detail later below reference to FIG. 8.

According to an embodiment, the processor 510 may use the temperature sensor 532 to obtain the second information about a temperature of a part of the user's body. For example, the processor 510 may use the temperature sensor 532 to identify the temperature of the part of the user's body. Based on the temperature of the part of the user's body, the processor 510 may identify the body temperature of the user. For example, the temperature of the part of the user's body may be distinct from the user's body temperature. The processor 510 may calibrate the temperature of the part of the user's body, based on information about the part of the user's body where the temperature sensor 532 is located.

According to an embodiment, the processor 510 may store the first information about the user's blood flow in the memory 540, in association with the second information about the temperature of the part of the user's body. For example, the processor 510 may store the first information about the user's blood flow and the second information about the temperature of the part of the user's body together. The processor 510 may identify the temperature of the part of the user's body corresponding to the amount of blood flow.

In operation 720, the processor 510 may change the state of the temperature sensor 532 from an active (enabled) state to an inactive (disabled) state. For example, the processor 510 may store the first information in association with the second information, and then change the state of the temperature sensor 532 from the active state to the inactive state.

In case where the temperature sensor 532 is utilized to monitor a temperature of a part of a user's body, the current consumption may increase. Therefore, the processor 510 may identify the temperature of the user's body corresponding to the blood flow, store the first information about the user's blood flow in association with the second information about the temperature of the part of the user's body, and then change the state of the temperature sensor 532 from the active state to the inactive state. Based on changing the state of the temperature sensor 532 from the active state to the inactive state, the processor 510 may decrease the current consumption.

In operation 730, the processor 510 may identify whether the first value representing the user's blood flow is out of a first range. For example, while the PPG sensor 531 is monitoring the user's blood flow and the temperature sensor 532 is kept in the inactive state, the processor 510 may identify whether the first value representing the user's blood flow goes out of the first range established based on the first information.

According to an embodiment, the processor 510 may use the PPG sensor 531 to monitor the user's blood flow. The current consumption of the PPG sensor 531 may be less than the current consumption of the temperature sensor 532. Therefore, the processor 510 may use the PPG sensor 531 to monitor the user's blood flow, while the temperature sensor 532 is kept in the inactive state. Based on monitoring the user's blood flow using the PPG sensor 531, the processor 510 may identify a first value representing the user's blood flow. For example, the processor 510 may identify a perfusion index (PI) using the PPG sensor 531. The processor 510 may identify the identified perfusion index as the first value.

For example, the processor 510 may set the first range based on the first information. The processor 510 may set the first range based on the first information stored in the memory 540. Each person may have different blood flow in a stable state. Therefore, the processor 510 may identify a value representing the user's blood flow in the stable state, based on the first information stored in the memory 540 in association with the second information. Based on the value representing the user's blood flow in the stable state, the processor 510 may set the first range.

For example, the processor 510 may identify whether the first value representing the user's blood flow goes out of the first range. In an example, the processor 510 may change the state of the temperature sensor from the inactive state to the active state, based on identifying whether the first value representing the user's blood flow is out of the first range.

According to an embodiment, the processor 510 may perform operation 730 according to a specified time interval, based on identifying that the first value representing the user's blood flow is not out of the first range (No in operation 730). The processor 510 may monitor the user's blood flow, based on identifying that the first value representing the user's blood flow is not out of the first range. Based on monitoring the user's blood flow, the processor 510 may identify other values representing the user's blood flow. The processor 510 may identify whether the identified other value is out of the first range.

In operation 740, in case that the first value representing the user's blood flow is out of the first range (Yes in operation 730), the processor 510 may change the state of the temperature sensor 532 from the inactive state to the active state. For example, the processor 510 may change the state of the temperature sensor 532 from the inactive state to the active state, in response to identifying that the first value representing the user's blood flow is out of the first range.

For example, the processor 510 may identify that the first value representing the user's blood flow is within the first range. Based on identifying that the first value representing the user's blood flow is out of the first range, the processor 510 may identify that there is a possibility that the temperature of a part of the user's body (or the skin temperature of the user) may have changed. The processor 510 may change the state of the temperature sensor 532 from the inactive state to the active state to identify (or measure) the temperature of the part of the user's body.

In operation 750, the processor 510 may identify whether the second value representing the temperature of the part of the user's body is out of the second range. For example, the processor 510 may identify whether the second value representing the temperature of the part of the user's body identified using the temperature sensor 532 that has changed to the active state is out of the second range established based on the second information.

According to an embodiment, the processor 510 may identify the second value representing the temperature of the part of the user's body, using the temperature sensor 532 which has changed to the active state. Based on identifying that the first value representing the user's blood flow is out of the first range, the processor 510 may identify whether the second value representing the temperature of the part of the user's body is out of the second range. Based on identifying that the user's blood flow has changed, the processor 510 may identify whether the temperature of the part of the user's body has changed.

For example, the processor 510 may set the second range based on the second information. The processor 510 may set the second range based on the second information stored in memory 540 as associated with the first information. A temperature (or body temperature) of a part of the body may vary from person to person in a stable state. Accordingly, the processor 510 may identify, based on the second information stored in memory 540, a value representing the temperature of a part of the user's body in a stable state. The processor 510 may set the second range based on the value representing the temperature of the part of the user's body in the stable state. The second range may refer to a reference range for providing a notification to the user.

According to an embodiment, the processor 510 may identify the second value representing the temperature of the part of the user's body, using the temperature sensor 532 disposed toward the part of the body. The processor 510 may calibrate the second value representing the temperature of the part of the body, based on information about the part of the body. Based on calibrating the second value, the processor 510 may obtain information about the user's body temperature. For example, the temperature of a part of the user's body may be different from the user's body temperature. To obtain information about the user's body temperature, the processor 510 may identify information about the part of the user's body. The processor 510 may identify the information about the part of the user's body, based on the shape of the electronic device 500. For example, the processor 510 may identify that the part of the user's body is a wrist, based on identifying that the shape of the electronic device 500 is of a watch shape. For example, the processor 510 may identify that the part of the user's body is a finger, based on identifying that the electronic device 500 is of a ring shape.

As the part of the user's body moves further away from the torso, a difference between the temperature of the part of the user's body and the body temperature may increase. Therefore, the processor 510 may calibrate the second value representing the temperature of the part of the user's body, based on the information about the part of the user's body.

In operation 760, in case where the second value representing the temperature of a part of the user's body goes out of the second range (Yes in operation 750), the processor 510 may provide a notification. For example, the processor 510 may provide the notification, based on identifying that the second value representing the temperature of the part of the user's body is out of the second range.

According to an embodiment, based on identifying that the second value representing the temperature of a part of the user's body is out of the second range, the processor 510 may identify that the amount of change in the user's skin temperature is equal to or greater than a reference amount of change. Based on identifying that the amount of change in the user's skin temperature is equal to or greater than the reference amount of change, the processor 510 may provide a notification for displaying a notification for the temperature change to the user.

For example, the processor 510 may identify that the temperature of a part of the user's body drops below the second range. The processor 510 may identify that the temperature of a part of the user's body drops by a reference amount of change or more. The processor 510 may provide a notification for displaying a warning that hypothermia may occur, based on identifying that the temperature of the part of the user's body drops by the reference amount of change or more.

For example, the processor 510 may identify that the temperature of a part of the user's body rises above the second range. The processor 510 may identify that the temperature of a part of the user's body rises above a reference amount of change. Based on identifying that the temperature of the part of the user's body rises above the reference amount of change, the processor 510 may provide a notification for displaying a warning that the user's body temperature may arise.

According to an embodiment, based on identifying that the second value representing the temperature of the user's body is out of the second range, the processor 510 may transmit, to an external electronic device connected to the electronic device 500, a signal for controlling the external electronic to provide a notification, using the communication circuitry (e.g., the communication circuitry 520 of FIG. 5). The external electronic device may provide the user with the notification, based on the signal received from the electronic device 500. For example, the signal for controlling the external electronic device may include at least one of the first value representing the blood flow of the user and the second value representing the temperature of a part of the user's body.

In operation 770, in case where the second value representing the temperature of a part of the user's body is not out of the second range (No in operation 750), the processor 510 may provide another notification to the user. For example, based on identifying that the second value representing the temperature of the part of the user's body is within the second range, the processor 510 may provide another notification.

According to an embodiment, based on identifying that the first value representing the user's blood flow is out of the first range, the processor 510 may identify the second value representing the temperature of a part of the user's body, using the temperature sensor 532. The processor 510 may identify that the second value is within the second range. The processor 510 may identify that the temperature of the part of the user's body has not changed, even though the user's blood flow has changed. The processor 510 may provide another notification to indicate that only the user's blood flow has been changed.

For example, based on identifying that the temperature of the part of the user's body has not been changed, but the user's blood flow has changed, the processor 510 may identify that the user's stress is increasing. The processor 510 may provide another notification to indicate that the user's stress is increasing.

For example, based on identifying that the temperature of the part of the user's body is not changed but the user's blood flow is changed, the processor 510 may identify that the user is experiencing a symptom of hypertension. The processor 510 may provide another notification to inform the user that hypertension is suspected.

According to an embodiment, the processor 510 may not perform the operation 770. Based on identifying that the second value representing the temperature of a part of the user's body is within the second range, the processor 510 may perform the operation 720. For example, the processor 510 may change the state of the temperature sensor 532 from the active state to the inactive state, based on identifying that the second value representing the temperature of the part of the user's body is within the second range. The processor 510 may change the state of the temperature sensor 532 from the active state to the inactive state, based on identifying that the temperature of the part of the user's body has not changed. By changing the state of the temperature sensor 532 from the active state to the inactive state, the processor 510 may reduce its current consumption (or power consumption).

According to an embodiment, the processor 510 may identify that a third value representing the user's blood flow identified after the state of the temperature sensor 532 is changed to the active state enters the first range. Based on identifying that the third value enters the first range, the processor 510 may change the state of the temperature sensor 532 from the active state to the inactive state. After obtaining the second value, the processor 510 may obtain the third value representing the user's blood flow. Based on identifying that the third value falls within the first range, the processor 510 may identify that the user's blood flow has returned to a stable state of blood flow. Based on identifying that the user's blood flow has returned to the stable state of blood flow, the processor 510 may change the state of the temperature sensor 532 from the active state to the inactive state.

Figure 8:
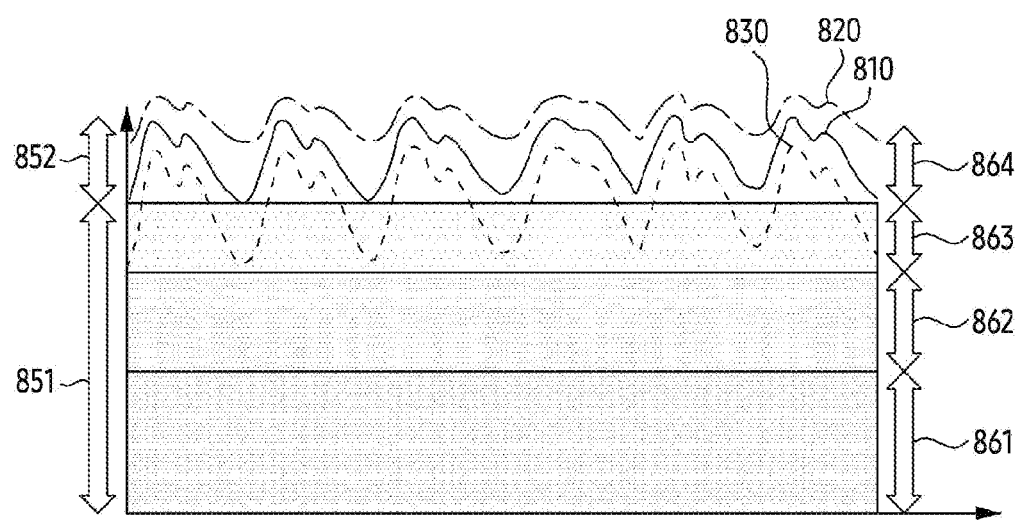
FIG. 8 is a diagram illustrating an example of trends on changes in blood flow of a user according to an embodiment.

FIG. 8 is a diagram illustrating an example of trends on changes in blood flow of a user according to an embodiment.

Referring to FIG. 8, a trend 810, 820 and/or 830 represent changes in a user's blood flow over time. The processor (e.g., the processor 510 of FIG. 5) may monitor the user's blood flow using a PPG sensor (e.g., the PPG sensor 531 of FIG. 5). Using the PPG sensor 531, the processor 510 may identify a trend (e.g., the trend 810 to the trend 830) that represents a change in the user's blood flow over time.

According to an embodiment, a trend representing a change in the user's blood flow may change depending on an ambient temperature. For example, in an environment where the ambient temperature is normal (e.g., an environment in which the user's body temperature is similar to the ambient temperature), the processor 510 may use the PPG sensor 531 to identify a trend representing a change in the user's blood flow as the trend 810. For example, in an environment with a relatively lower ambient temperature (e.g., an environment in which the ambient temperature is lower than the user's body temperature), the processor 510 may use the PPG sensor 531 to identify a trend representing a change in the user's blood flow as the trend 820. For example, in an environment with a relatively higher ambient temperature (e.g., an environment in which the ambient temperature is higher than the user's body temperature), the processor 510 may use the PPG sensor 531 to identify a trend representing a change in the user's blood flow as the trend 830.

According to an embodiment, processor 510 may identify a user's perfusion index (PI) based on a trend (e.g., the trend 810 to the trend 830) representing a change in the user's blood flow. For convenience of description, description will be made of an example of the processor 510 identifying the PI based on the trend 810.

For example, the processor 510 may identify a direct current (DC) signal component 851 and an alternating current (AC) signal component 852, based on the trend 810. For example, the direct current signal component 851 may include a first component 861, a second component 862, and a third component 863. The first component 861 may be generated by the body part, such as skin tissue and bones of the user's body. The second component 862 may be generated by the user's venous blood. The third component 863 may be generated by the user's non-pulsatile arterial blood. For example, the alternating current signal component 852 may include a fourth component 864. The fourth component 864 may be generated by the user's pulsatile arterial blood.

For example, the processor 510 may identify the direct current signal component 851 and the alternating current signal component 852, based on a baseline (e.g., envelope) of the trend 810. The processor 510 may identify the direct current signal component 851 based on the baseline (or an average value of the baseline) identified at the lower end of the trend 810. The processor 510 may identify the alternating current signal component 852, based on the peak-to-peak (p-p) (or an average value of the peak-to-peak) of the trend 810.

For example, the processor 510 may identify the direct current (DC) signal component 851 based on the average value of the trend 810. The processor 510 may identify the alternating (AC) current signal component 852 based on the peak-to-peak (p-p) (or the average value of the peak-to-peak) of the trend 810.

According to an embodiment, the processor 510 may identify a PI by identifying a ratio of the AC signal component 852 to the DC signal component 851. For example, the PI may be set as shown in Equation 1.

$$PI = \frac{AC}{DC} \times 100$$

The Equation 1 above is for an illustrative purpose only, without being limited thereto, and may be modified, adapted, or extended in various ways.

Referring to the Equation 1, 'AC' refers to the alternating current signal component 852 and 'DC' refers to the direct current signal component 851. 'PI' may be set as the ratio of the AC signal component 852 to the DC signal component 851. The unit of PI is % (percent).

For example, in case that a capillary constricts due to a decrease in ambient temperature, the amount of blood flowing through the capillary may decrease. As the blood flow decreases, the amount of light reaching the PD of the PPG sensor 531 may increase. When the amount of light reaching the PD increases, the DC signal component 851 may increase and the AC signal component 852 may decrease. Thus, the processor 510 may identify a PI that is lower than a reference value (e.g., PI when the ambient temperature is similar to the body temperature) when the ambient temperature is low.

For example, in case where the capillaries relax due to an increase in the ambient temperature, the amount of blood flowing through the capillaries may increase. As the blood flow increases, the amount of light reaching the PD of the PPG sensor 531 may decrease. When the amount of light reaching the PD decreases, the DC signal component 851 may decrease and the AC signal component 852 may increase. Thus, the processor 510 may identify a PI that is higher than the reference value (e.g., PI when the ambient temperature is similar to the body temperature) when the ambient temperature is high.

According to an embodiment, the processor 510 may identify the PI as a first value representing the user's blood flow. Based on whether the first value is within a first range, the processor 510 may determine whether to activate the temperature sensor (e.g., the temperature sensor 532 in FIG. 5).

Figure 9:
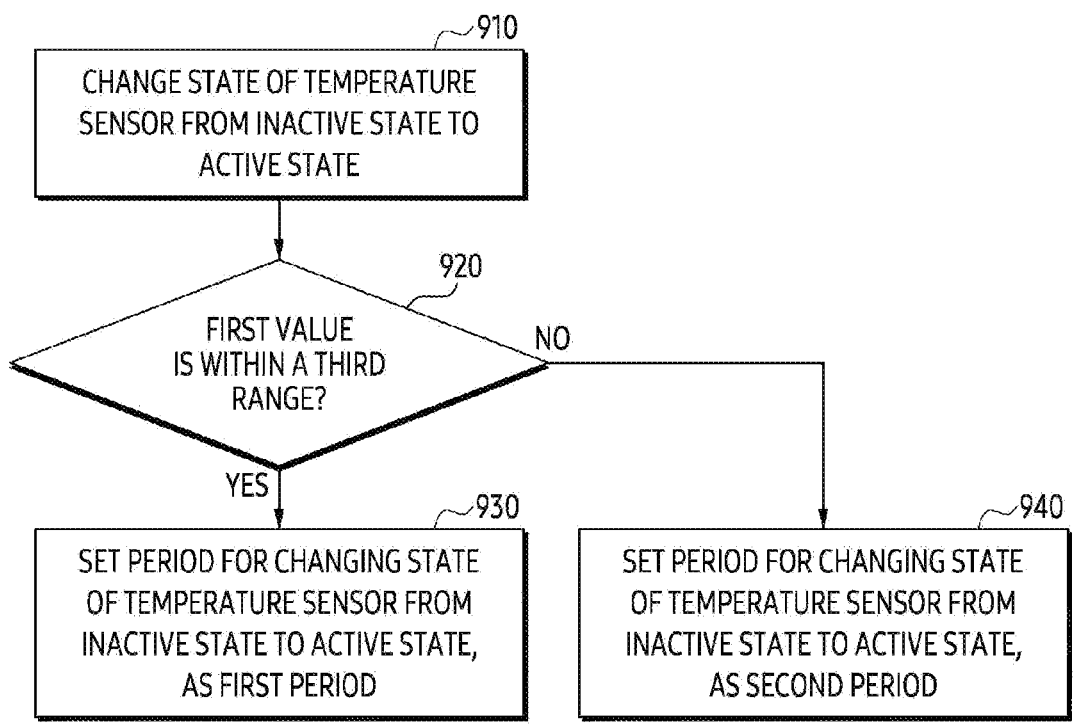
FIG. 9 is a flowchart illustrating example operation of an example electronic device according to an embodiment.

FIG. 9 is a flowchart illustrating an example operation of an example electronic device according to an embodiment.

In the following embodiments, each of the operations may be executed sequentially, but need not be essentially executed sequentially. For example, the execution sequence of the operations may be changed, and at least two of the operations may be performed in parallel.

According to an embodiment, it is to be appreciated that operations 910 to 940 may, for example, be performed by the processor (e.g., the processor 510 of FIG. 5) of the electronic device (e.g., the electronic device 500 of FIG. 5).

Referring to FIG. 9, in operation 910, the processor 510 may change the state of the temperature sensor (e.g., the temperature sensor 532 of FIG. 5) from the inactive state to the active state. For example, the processor 510 may change the state of the temperature sensor 532 from the inactive state to the active state, in response to identifying that the first value representing the user's blood flow is out of the first range. The operation 910 may correspond to the operation 740 of FIG. 7.

In operation 920, the processor 510 may identify whether the first value is within a third range. For example, the processor 510 may identify whether the first value is within the third range that is distinct from the first range, based on identifying that the first value representing the user's blood flow is out of the first range.

According to an embodiment, the processor 510 may set a third range and a fourth range that are out of the first range. For example, the processor 510 may set the first range, the third range, and the fourth range, based on the first information. In an example, the processor 510 may identify the user's state as a stable state, based on identifying that a value representing the user's blood flow is within the first range. Based on identifying that the value representing the user's blood flow is within the third range, the processor 510 may identify the user's state as an alert state. Based on identifying that the value representing the user's blood flow is within the fourth range, the processor 510 may identify the user's state as an emergency state.

In operation 930, in case where the first value is within the third range that is distinct from the first range (Yes in operation 920), the processor 510 may set a period (hereinafter, an operating period) for changing the state of the temperature sensor 532 from the inactive state to the active state, to a first period. After the temperature sensor 532 operates in the inactive state within a certain period of time according to the operating period, it may then operate in the active state. Thereafter, after the temperature sensor 532 again operates in the inactive state within the following period, it may then operate in the active state. That is, the state of the temperature sensor 532 may be periodically changed from the inactive state to the active state.

For example, activating of the temperature sensor 532 may refer to the temperature sensor 532 changing the temperature from a sleep state to an awake state. Deactivating of the temperature sensor 532 may refer, for example, to the temperature sensor 532 changing the temperature from an awake state to a sleep state.

For example, when the temperature sensor 532 is activated, it may refer, for example, to the temperature sensor 532 sensing a temperature. When the temperature sensor 532 is deactivated, it may refer, for example, to the temperature sensor 532 not sensing any temperature. For example, a period for changing the state of the temperature sensor 532 from the inactive state to the active state may refer, for example, to a sensing cycle.

Based on identifying that the first value is within the third range distinct from the first range, the processor 510 may set the period for changing the state of the temperature sensor 532 from the inactive state to the active state, to a first period.

In operation 940, when the first value is out of the third range distinct from the first range (No in operation 902), the processor 510 may set the period for changing the state of the temperature sensor 532 from the inactive state to the active state, as a second period. In case where the first value is out of the third range distinct from the first range, the processor 510 may set the period for changing the state of the temperature sensor 532 from the inactive state to the active state, to the second period, based on identifying that the first value is out of the third range distinct from the first range. For example, the processor 510 may identify that the first value is within the fourth range, based on the first value being out of the first range and then the third range. Based on identifying that the first value is within the fourth range that is distinct from the first range and the third range, the processor 510 may set the period for changing the state of the temperature sensor 532 from the inactive state to the active state, to the second period, which is shorter than the first period.

According to an embodiment, the processor 510 may identify a state of the user according to the first value representing the user's blood flow. Based on the user's state, the processor 510 may set a period for activating the temperature sensor 532. For example, the processor 510 may activate the temperature sensor 532 at a specified time interval, based on the first value representing the user's blood flow being out of the first range. The processor 510 may activate the temperature sensor 532 according to a first cycle, based on the user's state identified according to the first value being an alert state. Based on identifying that the user's state identified according to the first value is an emergency condition, the processor 510 may activate the temperature sensor 532 according to the second cycle that is shorter than the first cycle. Based on identifying that the user's blood flow is rapidly changing, the processor 510 may set the period for activating the temperature sensor 532 to be shorter.

Figure 10:
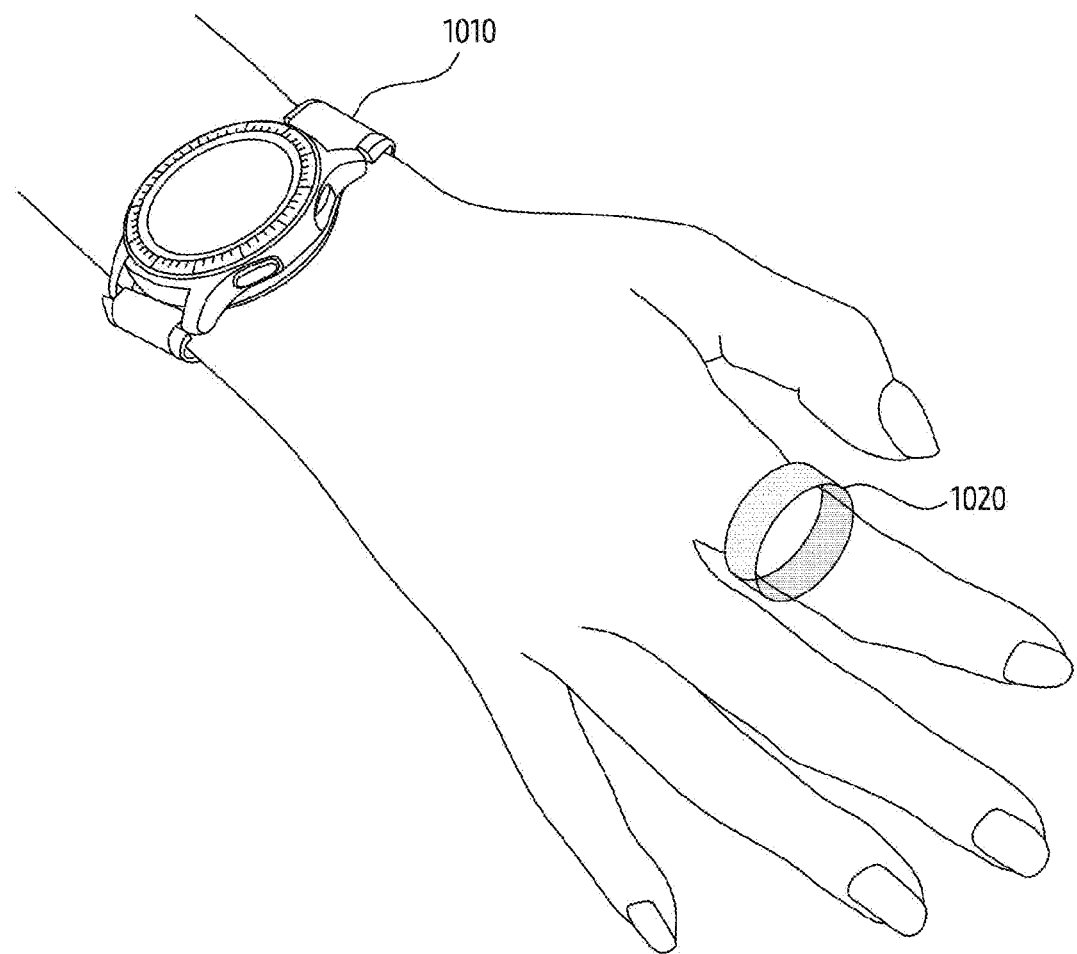
FIG. 10 is a diagram illustrating an example operation of an example electronic device according to an embodiment.

FIG. 10 is a diagram illustrating an example operation of an example electronic device, according to an embodiment.

Figure 11:
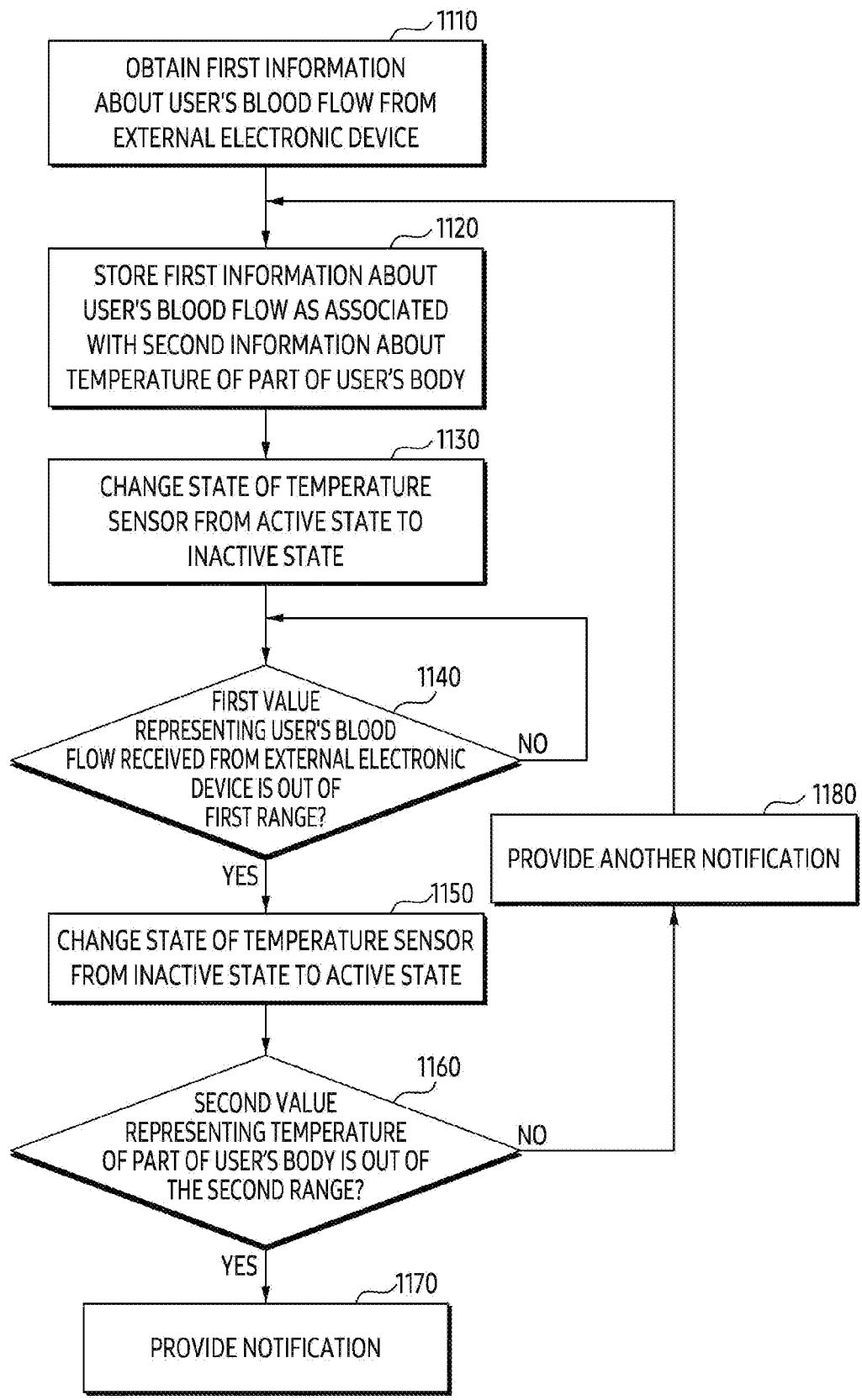
FIG. 11 is a flowchart illustrating example operation of an example electronic device according to an embodiment.

FIG. 11 is a flowchart illustrating example operation of an example electronic device according to an embodiment.

Referring to FIG. 10, an electronic device 1010 may include at least some of the components of the electronic device 500 of FIG. 5. For example, the electronic device 1010 may include a processor (e.g., including processing circuitry) 510, communication circuitry 520, a memory 540, and a temperature sensor 532. The electronic device 1010 may include, either one of a PPG sensor 531 and a temperature sensor 532, that is, only the temperature sensor 532.

According to an embodiment, the electronic device 1010 may be coupled to an external electronic device 1020. For example, the external electronic device 1020 may include the PPG sensor 531. The external electronic device 1020 may use the PPG sensor 531 to monitor a user's blood flow.

The processor 510 of the electronic device 1010 may obtain information about the user's blood flow from the external electronic device 1020. The processor 510 of the electronic device 1010 may receive the information about the user's blood flow from the external electronic device 1020, via the communication circuitry 520.

According to an embodiment, the electronic device 1010 may be worn on a first part of a user's body (e.g., a wrist). The external electronic device 1020 may be worn on a second part of the user's body (e.g., a finger). The electronic device 1010 may identify a temperature at the first part of the user's body. The external electronic device 1020 can identify a blood flow in the second part of the user's body. The processor 510 of the electronic device 1010 may determine whether to activate the temperature sensor 532, based on a first value representing the user's blood flow obtained by the external electronic device 1020. To determine whether to activate the temperature sensor 532, based on the first value representing the user's blood flow obtained by the external electronic device 1020, the processor 510 of the electronic device 1010 may perform operation 1110 to operation 1180 of FIG. 11.

In the following embodiments, each of the actions may be performed sequentially, but need not be essentially performed in sequence. For example, the execution order of each action may be changed, and at least two actions may be performed in parallel.

Referring to FIG. 11, in operation 1110, the processor 510 of the electronic device 1010 may obtain first information about the user's blood flow from the external electronic device 1020. For example, the processor 510 may obtain the first information about the user's blood flow from the external electronic device 1020 connected to the electronic device 1010. The external electronic device 1020 may monitor the user's blood flow. The external electronic device 1020 may transmit the first information about the user's blood flow to the electronic device 1010 based on a specified time interval. The processor 510 may receive the first information about the user's blood flow from the external electronic device 1020.

In operation 1120, the processor 510 may store the first information about the user's blood flow in association with second information about the temperature of a part of the user's body. For example, the processor 510 may store the first information about the user's blood flow in the memory 540 in association with the second information about the temperature of a part of the user's body identified using the temperature sensor 532.

For example, the processor 510 may set the state of the temperature sensor 532 to the active state, based on obtaining the first information about the user's blood flow from the external electronic device 1020. Using the activated temperature sensor 532, the processor 510 may obtain the second information about the temperature of a part of the user's body. The processor 510 may store the first information in memory 540 in association with the second information. For example, the operation 1120 may correspond to the operation 710 of FIG. 7.

In operation 1130, the processor 510 may change the state of the temperature sensor from the active state to the inactive state. For example, the operation 1130 may correspond to the operation 720 of FIG. 7.

In operation 1140, the processor 510 may identify whether the first value representing the user's blood flow is out of the first range. For example, the operation 1140 may correspond to the operation 730 of FIG. 7. In case where the first value representing the user's blood flow is out of the first range (Yes in operation 1140), the processor 510 may perform operation 1150. In case where the first value representing the user's blood flow is within the first range (No in operation 1140), the processor 510 may perform the operation 1140 again.

In operation 1150, when the first value representing the user's blood flow is out of the first range (Yes in operation 1140), the processor 510 may change the state of the temperature sensor 532 from the inactive state to the active state. For example, in response to identifying that the first value representing the user's blood flow is out of the first range, the processor 510 may change the state of the temperature sensor 532 from the inactive state to the active state. For example, the operation 1150 may correspond to the operation 740 of FIG. 7.

In operation 1160, the processor 510 may identify whether the second value representing the temperature of a part of the user's body is out of the second range. For example, the operation 1160 may correspond to the operation 750 of FIG. 7.

In operation 1170, when the second value representing the temperature of a part of the user's body is out of the second range (Yes in operation 1160), the processor 510 may provide a notification. For example, the processor 510 may provide the notification based on identifying that the second value representing the temperature of a part of the user's body is out of the second range. For example, the operation 1170 may correspond to the operation 760 of FIG. 7.

According to an embodiment, the processor 510 may provide the notification via at least one of the electronic device 1010 and the external electronic device 1020. For example, the processor 510 may provide the notification to the user only via the electronic device 1010 of the electronic device 1010 and the external electronic device 1020. For example, the processor 510 may provide the notification to the user via both the electronic device 1010 and the external electronic device 1020.

In operation 1180, when the second value representing the temperature of a part of the user's body is not out of the second range (No in operation 1160), the processor 510 may provide another notification. For example, based on the processor 510 identifying that the second value representing the temperature of the part of the user's body is within the second range, the processor 510 may provide another notification. The operation 1180 may correspond to the operation 770 of FIG. 7.

According to an embodiment, the processor 510 may provide another notification via at least one of the electronic device 1010 and the external electronic device 1020. For example, the processor 510 may provide another notification to the user only via the external electronic device 1020. Further, for example, the processor 510 may provide another notification to the user via both the electronic device 1010 and the external electronic device 1020. Although FIG. 11 illustrates an operation of providing another notification when the second value is not out of the second range, but the embodiments of the present disclosure are not limited thereto. According to an embodiment, the processor 510 may immediately perform the operation 1110 again, without performing the operation 1180, when the second value is not out of the second range.

According to an embodiment, the processor 510 may perform the operation 1110 after providing another notification. For example, after providing the another notification, the processor 510 may obtain the first information about the user's blood flow from the external electronic device 1020. The processor 510 may obtain the first information about the user's blood flow from the external electronic device 1020 at a specified time interval, and may perform the operation 1120 to the operation 1180.

According to an embodiment, an electronic device may comprise a photoplethysmography (PPG) sensor, a temperature sensor, a memory, and a processor operably coupled with the PPG sensor, the temperature sensor, and the memory. The processor may be configured to store first information on blood flow of a user obtained using the PPG sensor in the memory in association with second information on temperature of a part of the user's body obtained using the temperature sensor. The processor may be configured to, based on storing the first information associated with the second information, change a state of the temperature sensor from active state to inactive state. The processor may be configured to, based on the PPG sensor monitoring the blood flow of the user and the state of the temperature sensor being maintained in the inactive state, identify that a first value representing the blood flow of the user is out of a first range set based on the first information. The processor may be configured to, in response to identifying that the first value representing the blood flow of the user is out of the first range, change the state of the temperature sensor from the inactive state to the active state. The processor may be configured to identify that a second value representing the temperature of the part of the user's body identified using the temperature sensor changed to the active state is out of a second range set based on the second information. The processor may be configured to, based on identifying that the second value representing the temperature of the part of the user's body is out of the second range, provide a notification.

According to an embodiment, the processor is configured to identify a trend related to the blood flow of the user monitored using the PPG sensor. The processor may be configured to identify a value related to a ratio between a direct current (DC) signal component and an alternative current (AC) signal component of the trend of the blood flow of the user, as the first value representing the blood flow of the user.

According to an embodiment, the electronic device may further comprise a communication circuit. The processor may be further configured to, based on identifying that the second value representing the temperature of the part of the user's body is out of the second range, transmit, using the communication circuit, a signal for controlling an external electronic device connected with the electronic device to provide the notification, to the external electronic device.

According to an embodiment, the signal for controlling the external electronic device may include at least one of the first value representing the blood flow of the user or the second value representing the temperature of the part of the user's body.

According to an embodiment, the processor may be further configured to identify that a third value representing the blood flow of the user identified based on the state of the temperature sensor being changed to the active state enters the first range. The processor may be further configured to, based on identifying that the third value representing the blood flow of the user enters the first range, change the state of the temperature sensor from the active state to the inactive state.

According to an embodiment, the processor may be further configured to, in response to identifying that the first value representing the blood flow of the user is out of the first range, change the state of the temperature sensor from the inactive state to the active state. The processor may be further configured to, based on identifying that the second value representing the temperature of the part of the user's body obtained using the temperature sensor changed to the active state is within the second range, change the state of the temperature sensor from the active state to the inactive state.

According to an embodiment, the processor may be further configured to, based on identifying that the second value representing the temperature of the part of the user's body identified using the temperature sensor changed to the active state is within the second range, provide another notification representing that the first value representing the blood flow of the user is out of the first range.

According to an embodiment, the processor may be further configured to identify, using the temperature sensor disposed toward the part of the user's body, the second value representing the temperature of the part of the user's body. The processor may be further configured to calibrate, based on information on the part of the user's body, the second value representing the temperature of the part of the user's body. The processor may be further configured to obtain, based on calibrating the second value, information on body temperature of the user.

According to an embodiment, the processor may be further configured to, based on identifying that the first value is within a third range distinct from the first range, set a period for changing the state of the temperature sensor from the inactive state to the active state, as a first period. The processor may be further configured to, based on identifying that the first value is within a fourth range distinct from the first range and the third range, set the period for changing the state of the temperature sensor from the inactive state to the active state, as a second period.

According to an embodiment, the electronic device may further comprise a ring-shaped housing comprising an outer surface and an inner surface, and a layer comprising at least one printed circuit board, the layer being disposed between the outer surface and the inner surface. The PPG sensor, the temperature sensor, the memory, and the processor may be disposed in the layer. The PPG sensor may be disposed toward a first part of the user's body. The temperature sensor may be disposed toward a second part of the user's body.

According to an embodiment, an electronic device may comprise a temperature sensor, a communication circuit, a memory, and a processor operably coupled with the temperature sensor, the communication circuit and the memory. The processor may be configured to obtain, from an external electronic device connected with the electronic device, first information on blood flow of the user. The processor may be configured to store the first information on the blood flow of the user in the memory in association with second information on temperature of a part of the user's body obtained using the temperature sensor. The processor may be configured to, based on storing the first information associated with the second information, change a state of the temperature sensor from active state to inactive state. The processor may be configured to, based on the PPG sensor monitoring the blood flow of the user and the state of the temperature sensor being maintained in the inactive state, identify that a first value representing the blood flow of the user is out of a first range which is set based on the first information. The processor may be configured to, in response to identifying that the first value representing the blood flow of the user is out of the first range, change the state of the temperature sensor from the inactive state to the active state. The processor may be configured to identify that a second value representing the temperature of the part of the user's body identified using the temperature sensor changed to the active state is out of a second range which is set based on the second information. The processor may be configured to, in response to identifying that the second value representing the temperature of the part of the user's body is out of the second range, provide a notification.

According to an embodiment, a method of operating an electronic device may comprise storing first information on blood flow of a user obtained using a PPG sensor of the electronic device in a memory of the electronic device in association with second information on temperature of a part of the user's body obtained using a temperature sensor of the electronic device. The method may comprise, based on storing the first information associated with the second information, changing a state of the temperature sensor from active state to inactive state. The method may comprise based on the PPG sensor monitoring the blood flow of the user and the state of the temperature sensor being maintained in the inactive state, identifying that a first value representing the blood flow of the user is out of a first range set based on the first information. The method may comprise, in response to identifying that the first value representing the blood flow of the user is out of the first range, changing the state of the temperature sensor from the inactive state to the active state. The method may comprise identifying that a second value representing the temperature of the part of the user's body identified using the temperature sensor changed to the active state is out of a second range set based on the second information. The method may comprise in response to identifying that the second value representing the temperature of the part of the user's body is out of the second range, providing a notification.

According to an embodiment, the method may further comprise identifying a trend related to the blood flow of the user monitored using the PPG sensor. The method may further comprise identifying a value related to a ratio between a direct current (DC) signal component and an alternative current (AC) signal component of the trend of the blood flow of the user, as the first value representing the blood flow of the user.

According to an embodiment, the method may further comprise, based on identifying that the second value representing the temperature of the part of the user's body is out of the second range, transmitting, using a communication circuit of the electronic device, a signal for controlling an external electronic device connected with the electronic device to provide the notification, to the external electronic device.

According to an embodiment, the signal for controlling the external electronic device may include at least one of the first value representing the blood flow of the user or the second value representing the temperature of the part of the user's body.

According to an embodiment, the method may further comprise identifying that a third value representing the blood flow of the user identified based on the state of the temperature sensor being changed to the active state enters the first range. The method may comprise, based on identifying that the third value representing the blood flow of the user enters the first range, changing the state of the temperature sensor from the active state to the inactive state.

According to an embodiment, the method may further comprise, in response to identifying that the first value representing the blood flow of the user is out of the first range, changing the state of the temperature sensor from the inactive state to the active state. The method may comprise, based on identifying that the second value representing the temperature of the part of the user's body obtained using the temperature sensor changed to the active state is within the second range, changing the state of the temperature sensor from the active state to the inactive state.

According to an embodiment, the method may further comprise, based on identifying that the second value representing the temperature of the part of the user's body identified using the temperature sensor changed to the active state is within the second range, providing another notification representing that the first value representing the blood flow of the user is out of the first range.

According to an embodiment, the method further comprise identifying, using the temperature sensor disposed toward the part of the user's body, the second value representing the temperature of the part of the user's body. The method may comprise calibrating, based on information on the part of the user's body, the second value representing the temperature of the part of the user's body. The method may comprise obtaining, based on calibrating the second value, information on body temperature of the user.

According to an embodiment, the method further comprise, based on identifying that the first value is within a third range distinct from the first range, setting a period for changing the state of the temperature sensor from the inactive state to the active state, as a first period. The method may comprise, based on identifying that the first value is within a fourth range distinct from the first range and the third range, setting the period for changing the state of the temperature sensor from the inactive state to the active state, as a second period.

The electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, a home appliance, or the like. According to an example, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may be interchangeably used with other terms, for example, "logic", "logic block", "part", or "circuitry". A module may be a single integral component, or a minimum unit or part thereof, adapted to perform one or more functions. For example, according to an example, the module may be implemented in a form of an application-specific integrated circuit (ASIC).

Various embodiments as set forth herein may be implemented as software (e.g., a program 140) including one or more instructions that are stored in a storage medium (e.g., an internal memory 136 or an external memory 138) that is readable by a machine (e.g., an electronic device 101). For example, a processor (e.g., a processor 120 of an electronic device 101) of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   a photoplethysmography (PPG) sensor;
   a temperature sensor;
   a memory; and
   a processor operably coupled with the PPG sensor, the temperature sensor, and the memory, wherein the processor is configured to:
   store first information on blood flow of a user obtained using the PPG sensor in the memory in association with second information on temperature of a part of the user's body obtained using the temperature sensor,
   based on storing the first information associated with the second information, change a state of the temperature sensor from active state to inactive state,
   based on the PPG sensor monitoring the blood flow of the user and the state of the temperature sensor being maintained in the inactive state, identify that a first value representing the blood flow of the user is out of a first range set based on the first information,
   in response to identifying that the first value representing the blood flow of the user is out of the first range, change the state of the temperature sensor from the inactive state to the active state,
   identify that a second value representing the temperature of the part of the user's body identified using the temperature sensor changed to the active state is out of a second range set based on the second information, and
   in response to identifying that the second value representing the temperature of the part of the user's body is out of the second range, provide a notification.

2. The electronic device of claim 1, wherein the processor is configured to:
   identify a trend related to the blood flow of the user monitored using the PPG sensor, and
   identify a value related to a ratio between a direct current (DC) signal component and an alternative current (AC) signal component based on the trend of the blood flow of the user, as the first value representing the blood flow of the user.

3. The electronic device of claim 1, further comprising:
   a communication circuit,
   wherein the processor is further configured to:
   based on identifying that the second value representing the temperature of the part of the user's body is out of the second range, transmit, using the communication circuit, a signal for controlling an external electronic device connected with the electronic device to provide the notification, to the external electronic device.

4. The electronic device of claim 3, wherein the signal for controlling the external electronic device includes at least one of the first value representing the blood flow of the user or the second value representing the temperature of the part of the user's body.

5. The electronic device of claim 1, wherein the processor is further configured to:

identify that a third value representing the blood flow of the user identified based on the state of the temperature sensor being changed to the active state enters the first range, and based on identifying that the third value representing the blood flow of the user enters the first range, change the state of the temperature sensor from the active state to the inactive state.

6. The electronic device of claim 1, wherein the processor is further configured to:

in response to identifying that the first value representing the blood flow of the user is out of the first range, change the state of the temperature sensor from the inactive state to the active state, and based on identifying that the second value representing the temperature of the part of the user's body obtained using the temperature sensor changed to the active state is within the second range, change the state of the temperature sensor from the active state to the inactive state.

7. The electronic device of claim 6, wherein the processor is further configured to, based on identifying that the second value representing the temperature of the part of the user's body identified using the temperature sensor changed to the active state is within the second range, provide another notification representing that the first value representing the blood flow of the user is out of the first range.

8. The electronic device of claim 1, wherein the processor is further configured to:

identify, using the temperature sensor disposed toward the part of the user's body, the second value representing the temperature of the part of the user's body, calibrate, based on information on the part of the user's body, the second value representing the temperature of the part of the user's body, and obtain, based on calibrating the second value, information on body temperature of the user.

9. The electronic device of claim 1, wherein the processor is further configured to:

based on identifying that the first value is within a third range distinct from the first range, set a period for changing the state of the temperature sensor from the inactive state to the active state, as a first period, and based on identifying that the first value is within a fourth range distinct from the first range and the third range, set the period for changing the state of the temperature sensor from the inactive state to the active state, as a second period.

10. The electronic device of claim 1, further comprising:
a ring-shaped housing comprising an outer surface and an inner surface, and
a layer comprising at least one printed circuit board, the layer being disposed between the outer surface and the inner surface,
wherein the PPG sensor, the temperature sensor, the memory, and the processor are disposed in the layer,
wherein the PPG sensor is disposed toward a first part of the user's body, and
wherein the temperature sensor is disposed toward a second part of the user's body.

11. An electronic device, comprising
a photoplethysmography (PPG) sensor;
a temperature sensor;
a memory; and
a processor operably coupled with the PPG sensor, the temperature sensor, and the memory, wherein the processor is configured to:

obtain, from an external electronic device connected with the electronic device, first information on blood flow of the user, store the first information on the blood flow of the user in the memory in association with second information on temperature of a part of the user's body obtained using the temperature sensor, based on storing the first information associated with the second information, change a state of the temperature sensor from active state to inactive state, based on the PPG sensor monitoring the blood flow of the user and the state of the temperature sensor being maintained in the inactive state, identify that a first value representing the blood flow of the user is out of a first range set based on the first information, in response to identifying that the first value representing the blood flow of the user is out of the first range, change the state of the temperature sensor from the inactive state to the active state, identify that a second value representing the temperature of the part of the user's body identified using the temperature sensor changed to the active state is out of a second range set based on the second information, and in response to identifying that the second value representing the temperature of the part of the user's body is out of the second range, provide a notification.

12. A method of operating an electronic device, comprising:

storing first information on blood flow of a user obtained using a PPG sensor of the electronic device in a memory of the electronic device in association with second information on temperature of a part of the user's body obtained using a temperature sensor of the electronic device, based on storing the first information associated with the second information, changing a state of the temperature sensor from active state to inactive state, based on the PPG sensor monitoring the blood flow of the user and the state of the temperature sensor being maintained in the inactive state, identifying that a first value representing the blood flow of the user is out of a first range set based on the first information, in response to identifying that the first value representing the blood flow of the user is out of the first range, changing the state of the temperature sensor from the inactive state to the active state, identifying that a second value representing the temperature of the part of the user's body identified using the temperature sensor changed to the active state is out of a second range set based on the second information, and in response to identifying that the second value representing the temperature of the part of the user's body is out of the second range, providing a notification.

13. The method of claim 12, further comprising:
identifying a trend related to the blood flow of the user monitored using the PPG sensor, and
identifying a value related to a ratio between a direct current (DC) signal component and an alternative current (AC) signal component based on the trend of the blood flow of the user, as the first value representing the blood flow of the user.

14. The method of claim 12, further comprising:
based on identifying that the second value representing the temperature of the part of the user's body is out of the second range, transmitting, using a communication circuit of the electronic device, a signal for controlling an external electronic device connected with the electronic device to provide the notification, to the external electronic device.

15. The method of claim 14, wherein the signal for controlling the external electronic device includes at least one of the first value representing the blood flow of the user or the second value representing the temperature of the part of the user's body.

16. The method of claim 12, further comprising:
identifying that a third value representing the blood flow of the user identified based on the state of the temperature sensor being changed to the active state enters the first range, and
based on identifying that the third value representing the blood flow of the user enters the first range, changing the state of the temperature sensor from the active state to the inactive state.

17. The method of claim 12, further comprising:
in response to identifying that the first value representing the blood flow of the user is out of the first range, changing the state of the temperature sensor from the inactive state to the active state, and
based on identifying that the second value representing the temperature of the part of the user's body obtained using the temperature sensor changed to the active state is within the second range, changing the state of the temperature sensor from the active state to the inactive state.

18. The method of claim 17, further comprising:
based on identifying that the second value representing the temperature of the part of the user's body identified using the temperature sensor changed to the active state is within the second range, providing another notification representing that the first value representing the blood flow of the user is out of the first range.

19. The method of claim 12, further comprising:
identifying, using the temperature sensor disposed toward the part of the user's body, the second value representing the temperature of the part of the user's body,
calibrating, based on information on the part of the user's body, the second value representing the temperature of the part of the user's body, and
obtaining, based on calibrating the second value, information on body temperature of the user.

20. The method of claim 12, further comprising:
based on identifying that the first value is within a third range distinct from the first range, setting a period for changing the state of the temperature sensor from the inactive state to the active state, as a first period, and
based on identifying that the first value is within a fourth range distinct from the first range and the third range, setting the period for changing the state of the temperature sensor from the inactive state to the active state, as a second period.

* * * * *